Feb. 21, 1956  R. J. J. LE GOURRIEREC  2,735,893
AUTOMATIC SWITCHING SYSTEM APPLICABLE TO TELEPHONY
Filed Feb. 15, 1952  12 Sheets-Sheet 1

INVENTOR.
RENÉ JEAN JOSEPH LE GOURRIEREC
BY
*Robert Harding Jr.*
ATTORNEY

Feb. 21, 1956  R. J. J. LE GOURRIEREC  2,735,893
AUTOMATIC SWITCHING SYSTEM APPLICABLE TO TELEPHONY
Filed Feb. 15, 1952  12 Sheets-Sheet 2

INVENTOR.
RENÉ JEAN JOSEPH LE GOURRIEREC
BY
ATTORNEY

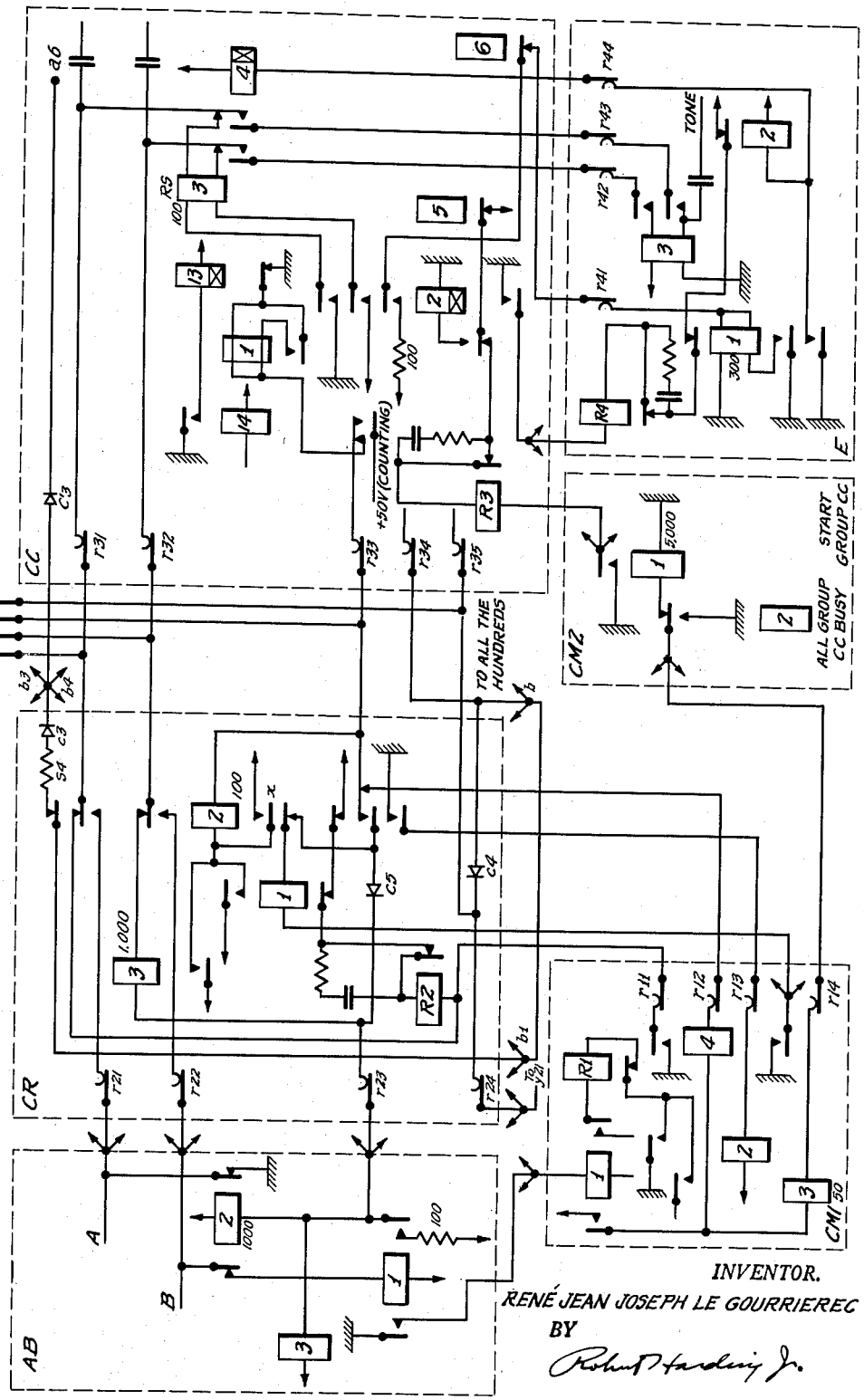
FIG. II.
INVENTOR.
RENÉ JEAN JOSEPH LE GOURRIEREC
BY
ATTORNEY

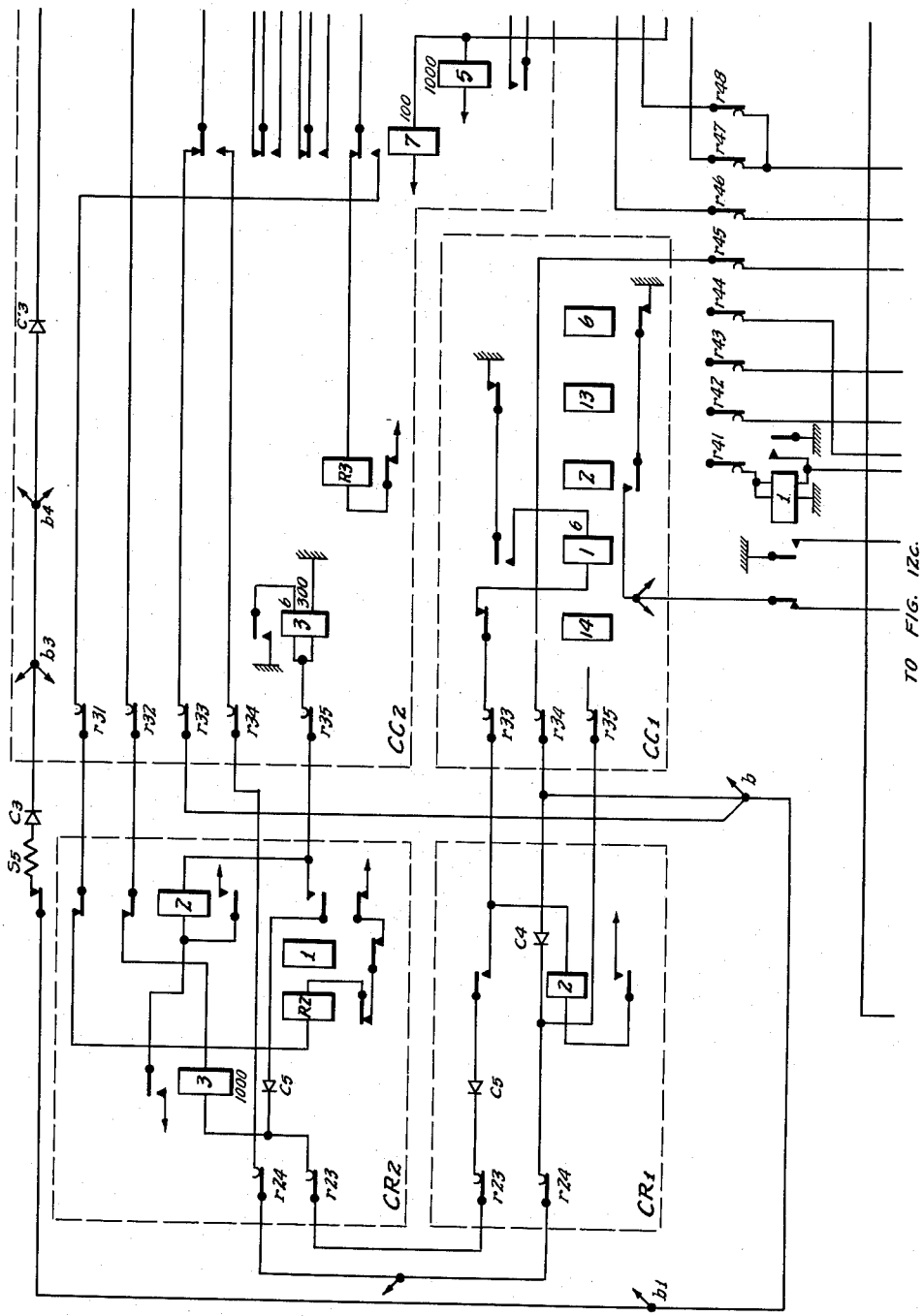

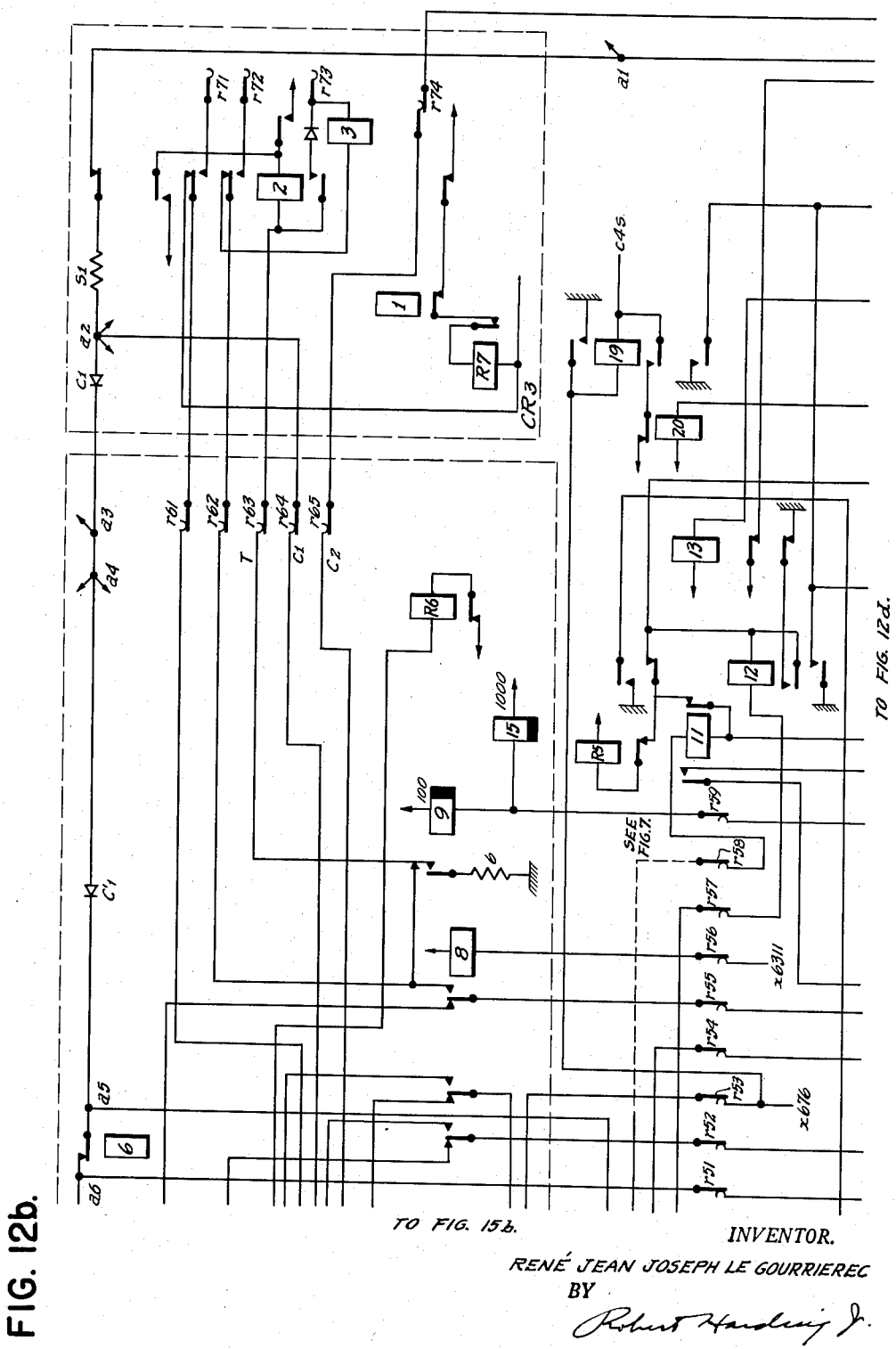

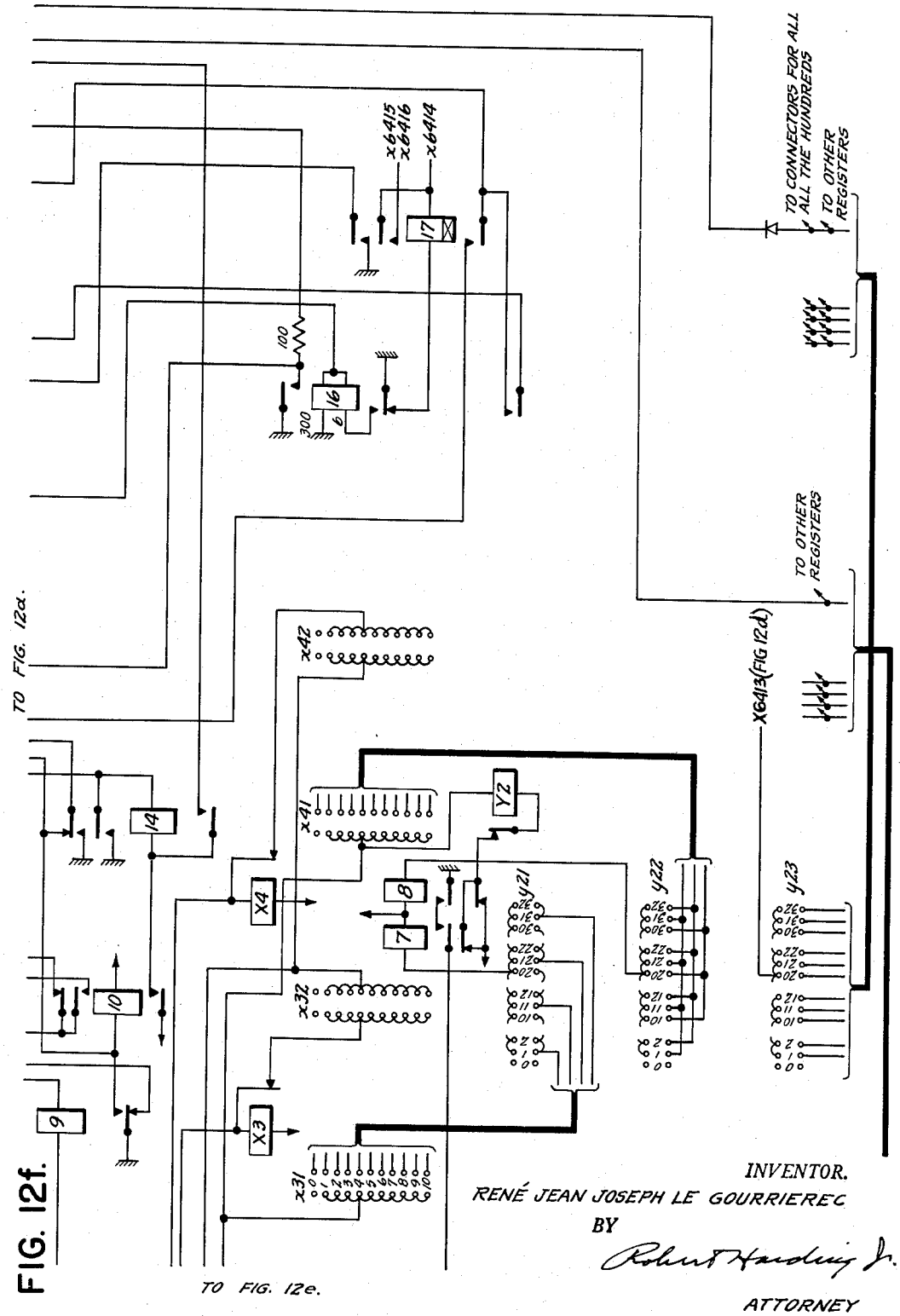

Feb. 21, 1956   R. J. J. LE GOURRIEREC   2,735,893
AUTOMATIC SWITCHING SYSTEM APPLICABLE TO TELEPHONY
Filed Feb. 15, 1952   12 Sheets-Sheet 9

INVENTOR.
RENÉ JEAN JOSEPH LE GOURRIEREC
BY
Robert Harding Jr.
ATTORNEY

Feb. 21, 1956   R. J. J. LE GOURRIEREC   2,735,893
AUTOMATIC SWITCHING SYSTEM APPLICABLE TO TELEPHONY
Filed Feb. 15, 1952   12 Sheets-Sheet 10

INVENTOR.
RENÉ JEAN JOSEPH LE GOURRIEREC
BY
Robert Harding Jr.
ATTORNEY

Feb. 21, 1956   R. J. J. LE GOURRIEREC   2,735,893
AUTOMATIC SWITCHING SYSTEM APPLICABLE TO TELEPHONY
Filed Feb. 15, 1952   12 Sheets-Sheet 11

INVENTOR.
RENÉ JEAN JOSEPH LE GOURRIEREC
BY
*Robert Harding Jr.*
ATTORNEY

United States Patent Office 2,735,893
Patented Feb. 21, 1956

2,735,893

AUTOMATIC SWITCHING SYSTEM APPLICABLE TO TELEPHONY

René Jean Joseph Le Gourriérec, Tunis, Tunisia

Application February 15, 1952, Serial No. 271,690

Claims priority, application France October 9, 1947

8 Claims. (Cl. 179—18)

The present invention has for its object a switching system applicable to automatic telephony and such like techniques, and one of its main features is to provide such a switching system wherein it is not necessary to have free selection in the connecting operations between calling and called subscribers or, in other words, that type of selection wherein the busy or free condition of the called subscriber line is unknown during the selection.

The invention also involves methods for establishing a connection between two subscribers of an automatic telephone exchange while using switching devices known in the art.

From the following description it will be appreciated that the present invention permits important savings in the number of switching devices to be set up in a central exchange for establishing a connection between two subscribers.

One hundred point selecting devices may be used as connectors or final selectors in known systems to make two selections in a decimal system, two switching devices being therefore sufficient to reach any subscriber of a 10,000 line exchange. It follows that a selecting device cannot be seized a priori to provide a connection before the wanted direction is known, since the switching device gives access to only one line of the said direction or to a small number of such lines, these lines having a high efficiency and having therefore a high probability of being busy. It is therefore necessary to test for the switching chain to be used from the calling to the called subscriber, before setting up the connection. A prior connection of the calling subscriber to a register will take place to enable this subscriber to indicate the number of the wanted subscriber. The digits of the wanted subscriber are stored in a register which then determines the switching chain to be used. In a 10,000 subscriber exchange, the chain to be used therefore comprises two switching devices (100 point switching devices if the subscribers are grouped by 100). These switching devices will hereinafter be termed "connectors" and a cord circuit is constituted by two selectors permanently interconnected, each of which permits to reach the connectors of the calling and of the called subscribers respectively. The number of switching devices, which are in fact used to set up a connection is therefore four, whereas it would be five at least in known systems using 100 point switching devices. Besides any cord circuit may provide any connection and these devices will, therefore have a very high efficiency. Consequently, the switching chain is symmetrical with respect to the calling and called subscribers and the system permits the use of the same devices as finders, and final selector switches, in known automatic telephone systems. That is the reason why the term "connector" will be used hereinafter.

It is advisable however to know that the cord circuit will provide a selector on the side of the called subscriber and a selector on the side of the calling subscriber, the system permitting, if necessary, to use separate finders and connectors. As it will be explained later on, the connectors may be considered as constituting substantially a perfect group, whereas in known systems the connectors (in the meaning in which the word is generally used in automatic telephone) are only reached through 10 directions.

According to one of its features, the invention provides a method for establishing a connection between a calling and a called line in an automatic telephone system through a connecting chain consisting in selecting of a chain adapted to effect the connection prior to effecting the switching operation.

According to another feature, the invention provides a method of reducing the number of switches used for setting up a connection between a calling and a called line in an automatic telephone exchange, consisting in using the same switching devices for setting up the connection either to the calling subscriber or the called subscriber, whereby ensuring the symmetry of the connecting chain.

The invention will be best understood by reference to the following description based on the accompanying drawings which represent, by way of example, an embodiment of the invention, and in which:

Figure 11 is detailed circuit showing the initial connection;

Figures 12a to 12f show a register circuit;

Figure 1:
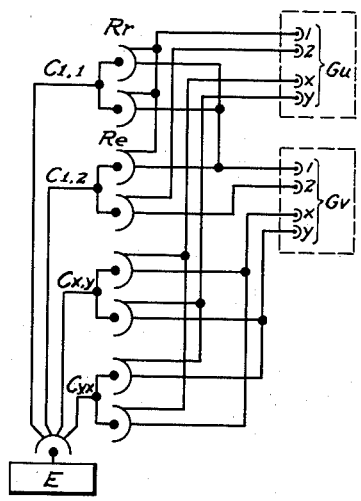
Figures 1, 2, 3, 4, 5 and 6 show different junction diagrams according to the present invention.

In Fig. 1, $Gu$ and $Gv$ represent a set of connectors 1, 2, $x$, $y$, for the hundred $u$, and for the hundred $v$. The cord circuits are represented in $C_{1,1}$, $C_{1,2}$, $C_{xy}$, $C_{yx}$, the cord circuit $C_{xy}$ being the one used to connect up the connectors of range $x$, on the side of the calling subscriber to the connectors of range $y$ on the side of the called subscriber. Finally one of the registers E is also shown. This register may have access to anyone of the cord circuits through a finder switch.

Figure 2:
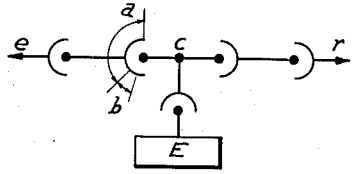

If, in the central exchange considered, special services are provided, or if this central exchange is part of a network comprising other exchanges, for the outgoing communications, two solutions are permissible and can be used jointly or separately, according as to the results of the computation concerning the importance of the traffic to be handled and as to the degree of saving to be achieved:

(a) Certain azimuths or directions on the selector of the cord-circuit on the called subscriber side will be alloted for special services or for outgoing calls. If the installation is limited to a capacity of 9000 lines it will be seen that there will be ten directions or azimuths available for this purpose on each cord circuit. Fig. 2 relates to this arrangement and shows a calling subscriber "$r$" and a called subscriber "$e$." The cord circuit is used for local calls and for outgoing calls. The angular directions or azimuths of arc "$a$" are reserved for the connectors of the exchange, and those of arc "$b$" for outgoing trunks. E is a register.

(b) Each outgoing line or special service line will terminate on a selector (which will be termed "half-cord circuit") permitting the calling subscriber to be reached.

Figure 3:
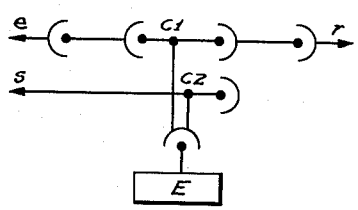

In Fig. 3, $C_1$ represents a cord circuit allotted to local call and $C_2$ a half-cord circuit allotted to outgoing calls. S is an outgoing trunk. The setting up of a connection is made as follows (see Figs. 4 and 5).

1. A subscriber "$r$" is seized according to known technique by a register E through a connector associated with a cord circuit C and one (or two, if the number of cord circuits justifies) of the register finders.

Figure 4:
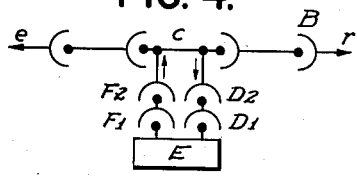
Figure 5:
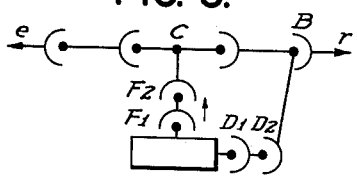

Fig. 4 represents the case of two register finders $D_1$, $D_2$. In another case the connector B will be directly taken into use by a finder or two register finders ($D_1$, $D_2$) by means also known (Fig. 5). One or the other alternatives will be chosen as to which is most economical, account being taken of the number of subscribers, of the traffic to be handled, and of the simplification of the cord circuits to carry out an operation in the second alternative. On Figs. 4 and 5 there are shown sets of two register finders. After connection to the register, the subscriber may dial.

2. As soon as the register has received sufficient information (hundred digits of the called subscriber for a local call, outgoing direction in the case of a connection for a subscriber belonging to another exchange), the chain to utilise is searched for. The cord circuit is selected and taken into use by the register of a second register finder (or a second set of two register finders).

Figs. 4 and 5 represent in $F_1$, $F_2$, sets of two finders having this function; afterwards the orientation operation of the cord circuit takes place.

3. The connectors on the side of the calling and called subscribers are also put in motion and set up, and afterwards the chain which has been used for the recording of the number of the called subscriber is released.

Figure 6:
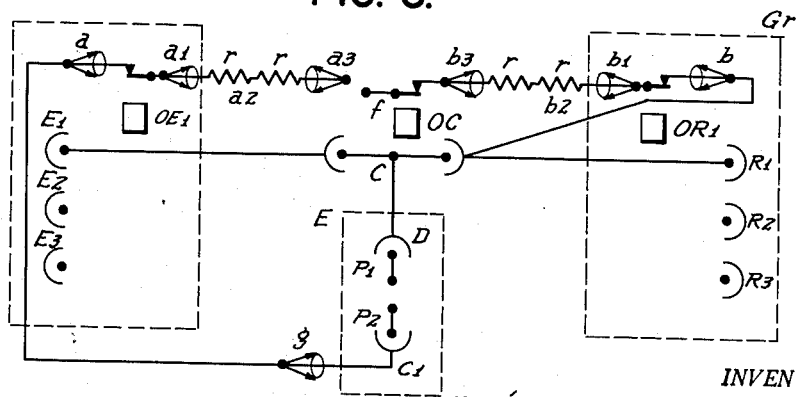

4. The register is released. The normal operation of transmission of ringing current and eventually of metering impulses take place. The essential operation consists in the choice of the free cord circuit giving access to 2 free connectors for the hundred digits of the calling and called subscribers. A process for making this choice is illustrated in Fig. 6. This diagram is established for the alternative shown in Fig. 4. The alternative shown in Fig. 5 would lead to an analogous diagram and to similar explanations. On Fig. 6 there are shown connectors $R_1$, $R_2$, $R_3$, for the hundred digits of the calling subscribers and $E_1$, $E_2$, $E_3$, for the hundred digits of the called subscriber. There will also be seen on this figure a register E with a rotating switch $C_1$ which receives the digits corresponding to the hundred digits of the called subscribers. C is a cord circuit and D is a register finder used for the connection of the calling subscriber to the register. As soon as the digits are received, the register applies to point "$a$" recurrent pulses the position of which, with respect to a reference cycle, characterizes the register, as it will be explained later, or one terminal of an alternating current source, the frequency of which characterises the register is connected to point "$a$." The term "signalling" used hereinafter will designate one or the other of these sources. The letters $p_1$, $p_2$ designate the poles of this signalling source. In point "$g$" are the connections from switches $C_1$ of all the registers and comprising the same hundred.

The circuit $a$, $a_3$, represented on the Figure 6, is made up in the following way; "$a$" is a branching point reserved for the hundred digits. From "$a$" are branched as many connections $a$, $a_1$, as there are connectors in the hundred, that is "$n$." A connection is opened when the connector to which it belongs is busy $a_1$ is a branching point reserved for each connector. From $a_1$ are branched connections $a_1$, $a_3$, the number of which is equal to the number of cord circuits with which the connector is associated on the called subscriber side. If $p$ is the number of cord circuit and $q$ the number of hundreds, the number of connections $a_1$, $a_3$ is $p$ multiplied by $q$. Each one of these connections comprises a resistance $r$, the middle point of which $a_2$ is accessible, $a_3$ is a branching point reserved to a particular cord circuit on the side of the called subscriber. In point $a_3$ are branched all the connections $a_1$, $a_3$, corresponding to the various connectors (whatever the hundred may be) to which lead the cord circuits on the side of the called subscribers. Points $b$, $b_1$, $b_2$, $b_3$ . . . correspond respectively to points $a$, $a_1$, $a_2$, $a_3$, the connection comprising the same elements being made up in a symmetrical way, but the portions $b$, $b_3$, correspond to the side of the calling subscriber on the cord circuit. Finally, the connection $fb_3$ is broken when the cord circuit is busy. It will therefore be seen that the circuits shown in $a$, $a_3$ and $b$, $f$ correspond to an automatic chain permitting the connecting up of the calling and the called subscribers. The continuity of the circuits is provided if all the corresponding devices are free, then if signalling current is applied to point $a$ (by means of $C_1$) and to point $b$ (by means of D and C), this signalling current appears simultaneously in points $f$ and $a_3$ of the cord circuit corresponding to possible chains. The register will connect itself to one of the cord circuits through switches D and thus will cause the selectors on the calling and called subscribers' sides to proceed with the necessary selections. These selections will be made quickly. However, if during the interval one of the connectors were taken into use for another connection, a new cord circuit capable of providing the connection would be chosen.

Figure 10:
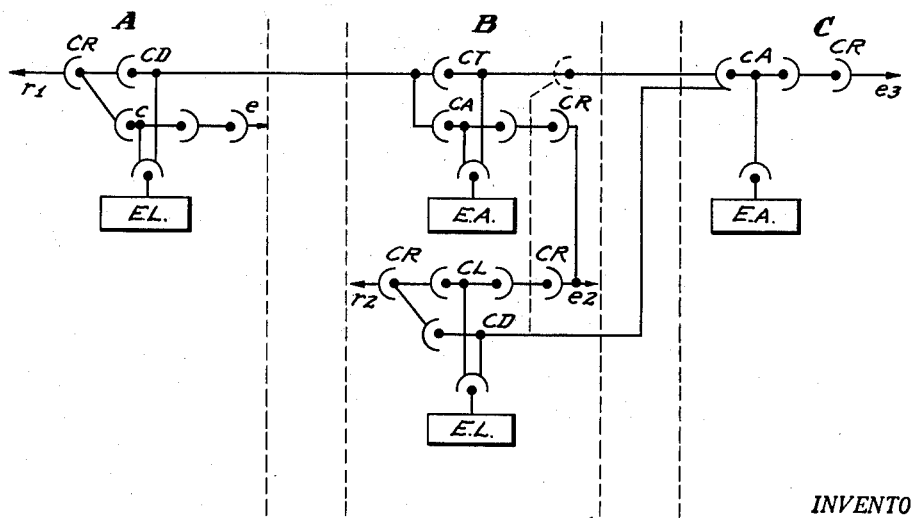

The detail of the operation for the choice of a suitable cord circuit and for the orientation of this cord circuit is shown on Fig. 10. In the two alternatives for the connection of the calling subscriber to a register (Figs. 4 and 5), an additional register finder is necessary (or a set of two if the number of cord circuits justifies) for the connection of the register to the cord circuit which will be used by responsive device $t$ in disposing of the connection. This is already shown on Figs. 4 and 5 by switches $F_1$, $F_2$. It will be seen therefore that the choice of a cord circuit and the orientation thereof may be made during the time that the calling subscriber sends the last digits of the number of the wanted subscriber.

Figure 8:
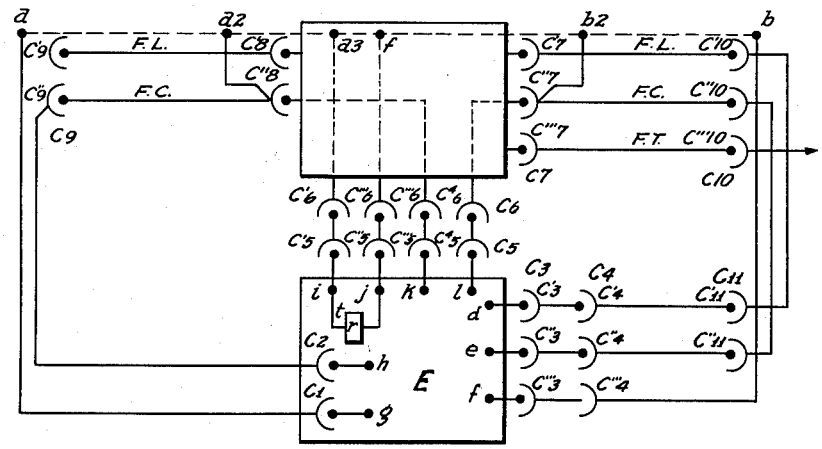
Figures 8, 9 and 10 show more detailed junction diagrams according to the present invention.

Fig. 8 is established for the same case as Fig. 5; the case of Fig. 4 would lead to analogous explanations. In Fig. 8 certain details of Fig. 6 as the circuits $a_1$, $a_3$ and $f$, $b$ are not represented, but the banks of the rotating switches are partially detailed whereas these were represented only by half a circle on Fig. 6. Letter C followed by an index designates a switch. The banks of switch $C_3$ for example, will be designated by $C'_3$, $C''_3$, $C'''_3$, etc. $C_{11}$ is the connector through which the connection with the register is established by means of the two finders $C_3$ and $C_4$. $C_{11}$ is an ordinary connector capable of establishing a connection. $C_1$ is a switch on which are received the digits sent by the subscriber, and designating the hundreds of the called subscriber or of the outgoing line. If several digits are necessary for this purpose these digits are first received on decimal switches which will afterwards permit the orientation of $C_1$. It is in points $g$ and $f$ of the register E that will be applied the signalling current for finding the cord circuit; this signalling current is obtained through switches $C_5$ and $C_6$ or more precisely by banks $C''_6$ and $C''_5$ and $C'_5$ and $C'_6$. When relay $r$ operates, the rotation is interrupted and the cord circuit is suitable. In order that the signalling current coming from another register does not operate the relay, there is provided in the device $t$ either a contact that will only be closed at the moments where the recurrent pulses characterising the registers are applied on the register considered (this contact will be conveniently constituted by the cathode-anode space of a triode, the grid of which will be controlled by a shunting circuit from the recurrent pulses generator), or, in the case of a frequency proper to a register, a resonant circuit tuned to the frequency considered. Besides, to prevent in certain arrangements the passage of the signalling current emanating from another register between the points $f$ and $g$, for instance, it is necessary that the current source providing the signalling current has a high impedance for the signalling current outgoing from another register, and this is obtained from the recurrent pulse generator, and this will be obtained in the case of frequencies by the insertion of a resonating circuit in $g$ or $f$. In Fig. 8, FL, FC and FT designate respectively the wires of the line, the control wire, and the metering wire.

The following problems have now to be solved: orientation of the cord of the calling and of the called subscribers and then orientation of the connectors. For the orientation on the side of the calling subscribers it is necessary to identify the calling subscriber unless a marking system by recurrent pulses is used.

The problems of the identification of the calling subscriber and of the orientation of the switches by their register when the required numerical elements are given, are well-known problems which may be solved in many ways. I shall describe hereafter a solution using recurrent pulses. The principle of this method consists of the use, in controlling operations, of the same battery (which may be the central battery of the exchange, for instance) by each register successively. At a given moment only one register makes use of the battery. Each register receives thus pulses of duration $t$, two successive pulses being separated by a time $T$. The time $T$ must be sufficiently short to enable the respective relays to be locked between two pulses, and moreover to ensure that during the time required for passing a given terminal of a switch, two, three or four pulses may be transmitted in order that the stopping on this terminal may be definite.

If this speed of the switch is 50 steps per second, for instance, $T$ shall be $\frac{1}{100}$ to $\frac{1}{200}$ of a second. On the other hand, if $m$ registers are available, $t$ should be chosen less $$\frac{T}{m}$$

Furthermore, the power received by the relays will be $$\frac{T}{t}$$

times smaller than that which would have been received from a continuous battery having the same voltage. This power will thus be the same as that of continuous battery having a potential $$\frac{T}{t}$$

times smaller. For equal resistances, the relays should be designed accordingly. One can choose $$\frac{T}{t}m$$

If $m$ equals 25, for example, and $T$ equals $\frac{1}{150}$ sec., $t$ equals $\frac{1}{3750}$ will result. A practical means for effecting this arrangement consists in using a rotating machine provided with a connector, each blade of which is connected to the register. In the example chosen, 25 blades are used. The brush is connected to the battery; the speed of rotation is 150 turns per second, that is 9000 turns per minute.

Figure 7:
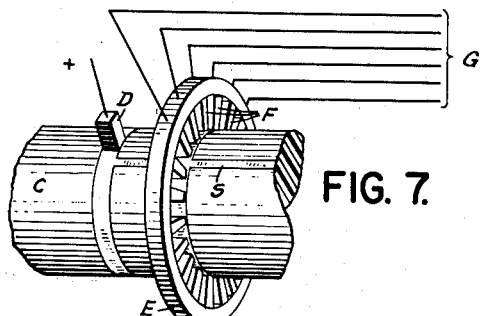
Figure 7 shows a mechanical distributor.

The distribution of the pulses may be realized by means of a mechanical distributor design, according to Figure 7. On this figure, there has been shown a motor driven rotor C. A metallic sector S of this rotor is connected to the positive terminal of a battery through a ring B, electrically connected to sector S. A fixed isolated ring E comprises as many brushes F as registers of the exchange. The thickness of the sector S is less than the distance between two adjacent brushes. These brushes are connected to leads G, on which pulses appear, each pulse being used to characterize a register. If the motor rotates at 600 R. P. M., two successive pulses characterizing a register are separated by $\frac{1}{100}$ second.

It is to be noted that the distribution may be made from the negative terminal of the battery, while using the same device. The distribution of pulses may also be realized by means of electronic components, as it is well known in the art. For instance, by using a pulse generator which feeds pulses to a delay line having multiple taps, the propagation delay between two successive taps being equal to the interval of time between two adjacent pulses. The pulses characterizing the registers may also be obtained from a cathode ray tube used as distributor, the pulses obtained from this tube being properly amplified.

It will be also possible, in a case where a practical construction is difficult, to use, in place of a single battery successively distributed, $n$ independent batteries, each of which is successively distributed to $$\frac{m}{n}$$

registers. The ratio $$\frac{T}{t}$$

will therefore be smaller.

Fig. 8 is drawn in the case where recurrent pulses are used. Assuming that the cord has been chosen, the orientation has to be effected. The connection of $a_2$ and $b_2$ on the control banks $C''_7$ and $C''_8$ enables the orientation of the switches $C_7$ and $C_8$ to be used. At points $k$ and $l$ exists the potential of the pulses $a_2$ and $b_2$ when the switches pass over the azimuth desired positions, and the stopping occurs in a well known manner.

The sending of the signals between points $g$ and $b$ then ceases. In the case where, during the orientation of the switches on the side of the calling and called subscribers, the cord or one of the respective connectors might be seized by another communication, relay $r$ would fall back and arrangement would be made so that switches $C_5$ and $C_6$ would start again. To orient to the connector on the side of the called subscriber, the signals are applied to point $h$ by means of switch $C_2$. When the connector is orient on the desired line, the signals are applied once more at point $k$, whereby stopping occurs. On the side of the calling subscriber the operations are similar, and the signals are transmitted by end $C''_{11}$. The orientation of C may also be made in two steps, first the tenths, then the units, according to well-known methods. The selection is then finished, and the ringing of the called subscriber and, if necessary, the metering are effected according to one of the well known methods. In the alternative embodiments of Fig. 4, the same arrangement as in Fig. 8 may be used, including the selector of the calling side of a cord-circuit and $C_3$ a register finder (which may be replaced by two finders), if it is found economical according to the amount of traffic.

Figure 9:
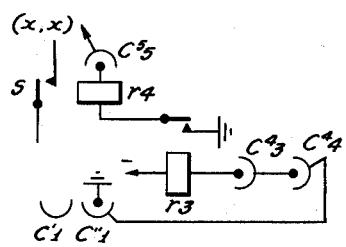

It is necessary to examine particularly the case of the communication of a subscriber of one hundred to another subscriber in the same hundred. The register must be informed that such a communication is to be made. Fig. 9 indicates the manner in which (in this case, a cord $(x, x)$), the prevention of the completion of the communication, may be avoided. The reference numerals are those of Fig. 8; $C5_5$, $C4_3$, $C4_4$, $C''_1$ are additional banks on switches C5, C3, C4, and C1. The terminals of C4 and $C''_1$, corresponding to the same hundred, are connected.

When such a call is effected, relay $r_3$ is energized, and therefore each time the brushes of the finder C5 pass on an azimuth position corresponding to a cord $(x, x)$, relay $r_4$ is operated and closes contact $s$, ensuring the continuation of the hunting.

The description of the operations as described above corresponds to the case of a local communication which is the more complicated from the point of view of choice of chain. The cases of outgoing, incoming and transit communications, are treated by very similar means.

The calculation of the probability of a lost call in the present system is very new with respect to the case of known systems, because it is not a question of disposing of a switch or of a connector for the calling and the called subscribers during busy periods, but a complete, free, chain must be found. The probability of a lost call may be calculated as follows; it is the sum of the probabilities that all the connectors in the number of $n$ on the side of the calling or called subscribers are busy, that is $2 \times p_n$ ($p_n$, $p_{n-1}$, $p_{n-2}$ etc.) are the probabilities that $n$, $n-1$, $n-2$ elements are busy, which are the probabilities given by the Erlang formula, plus, if only one connector is free on each side, the product of the probability of this fact ($p_{n-1} \times p_{n-1}$) by the probability that all the cords connecting said connectors two by two are busy, that is $p_r$, $r$ being the number of the cords which may connect the two connectors, plus, if one of the connectors is free at one side and two are free on the other side, which may occur in two ways, according to the fact that the called sides or the calling sides have only one free connector, the result of the probability of this fact:

$$2 \times p_{n-1} \times p_{n-2}$$

by the probability that the $2r$ possible cords are busy, that is $p_{2r}$ and so on. Thus (1) $2p_n + (p_{n-1})^2 P_r + 2p_{n-1}p_{n-2}P_{2r} + (p_{n-2})^2 P_{4r} + 2p_{n-1}+p_{n-3}P_{3r} + \ldots$ The reasoning leads to the following formula for $p_r$ (2) $$P_r = \sum_{m=0}^{m=n} \frac{e^{-y}y^m}{m} \cdot \left(\frac{m}{n}\right)^r$$

which becomes:

$$P_r = \left(\frac{y}{n}\right)^r \times \left(1 + \frac{r(r-1)}{y}\right)$$

for the values of $r$ which are not too high, a formula which is further reduced to $$P_r = \left(\frac{y}{n}\right)^r$$

when $r(r-1)$ is small in respect to $y$. In the Formula 2, $y$ is the reduced traffic passing through the cords, and $n$ the total number of cords. The formula is consistent in the case where the $r$ possible cords are designated at random, and may be repeated. It therefore leads to a greater value in the present case where the connections are made in such a way that their repetition is less frequent than if given at random.

In particular cases numerical calculations show that for usual traffic the sum of Formula 1 is of the same order as $2p_n$. The calculation is to be drawn in each case. The calculation of $r$ which is the number of cords connecting two determined connectors two by two, must be studied particularly. Calculation will begin with number $p$ of cords, according to the usual probability curves, assuming that the lost calls will be one third of the probability of the total loss sought. If $n^2$, $2n^2$, $3n^2$, etc. . . . , are obtained, then $r$ equals 1, 2, or 3. This will not generally be the case, and $$\frac{p}{n2}$$

will not be a whole number. However, $$r = \frac{p}{n2}$$

will be taken, and this number will be used in the above formula, giving $p_r$. A greater number will thus be obtained for the loss probability, if the following precautions are taken. Let us say that $r = r_1 + r'$, $r_1$ being the whole number immediately below $r$ ($r_1$ may be equal to zero). Two connectors are therefore connected by at least $r_1$ cords. The group of the $r'n^2$ remaining cords will comprise only cords ($x$, $y$) so that $x$ or $y$ are greater than $n_1$ which necessitates $r'n^2 = n^2 - n_1^2$. In other words, a connector having a rank superior to $n_1$ will be connected to all the other connectors by means of ($r_1 + 1$) cords, while 2 connectors having a rank inferior or, equal to $n_1$ are connected only by $r_1$ cords. In order that said connectors might be, however, efficient, they will be used first, particularly for the connection to the register. Thus, the connectors having a rank superior to $n_1$ will be kept apart as having more possibilities.

The above considerations assume that only one connector in the hundred under consideration is connected on the side of the calling subscriber, and only one also, on the side of the called subscriber, in the cord. This may not be the case if the number of subscribers is considerably below 10,000. As will be explained later, outgoing or incoming lines will be connected in certain cases. Several connectors of the same hundred may also be connected on the same side. The number $r$ will thus be bettered, and the probability of loss will be diminished.

The probability of loss in the case of outgoing communications, incoming communications and transit communications is also to be examined. In the alternative embodiment of Fig. 2 it will be seen that an outgoing line or a special service line will be seized, only if one of the $r$ cords giving access to it is free. Fictitious traffic must therefore be added to the actual traffic of the outgoing lines, which fictitious traffic has for value, for each line, the probability that the $r$ cords are busy. It has been seen that this probability is in the order of magnitude of $$\frac{y}{n}r$$

Since $$\frac{y}{n}$$

(which is the probability that a determined cord is busy) is as near to 1 as $n$ is high, $r$ must be high, in order that the fictitious traffic remains low. If $z$ azimuth positions are available for X lines, and if $p$ is a number of cords, then $r$ equals $$\frac{z \times p}{X}$$

In all cases, $p$ is greater than X, but, if the traffic to the considered direction is important with respect to the whole traffic passing by the cords, $$\frac{p}{X}$$

will not be much superior to 1, and $r$ will be of the order of magnitude of $z$. It is therefore seen that the said alternative is convenient only for directions having a low traffic, unless a considerable number $z$ of azimuth positions is available, which will be the case if the number of subscribers, that is, the number of hundreds, is low. In the alternative embodiment of Fig. 3, on the contrary, each line being provided with a switch, no fictitious traffic is added to the actual traffic, and the number of lines of the junction must be calculated according to the usual curves for a perfect group. This alternative will thus be preferred except in particular cases, since moreover, it allows the simplification of the employed equipment, because of the specialisation of the operations, and since, further, the total number of rotating elements in the exchange will be lower, as the outgoing communications will stop only one rotating element, instead of two. The incoming lines of an exchange will be similarly considered. Said lines may be seized by the local cords if on the side of the calling subscriber, ten azimuth positions, for instance, for each switch, will be reserved. Such cords will ensure the transit traffic and the incoming traffic. For the same reasons, as above indicated, this alternative will be used only for particular cases.

Fig. 10 indicates the organisation of a great network, wherein the communications between two exchanges A and C, may be obtained by transit through a third exchange B; $r_1$, $r_2$ are calling subscribers, $e_1$, $e_2$, $e_3$, called subscribers, CR are connectors, CL local cords, CA incoming cords, CD outgoing half-cords, CT is a transit half-cord, EL local and outgoing registers, EA incoming and transit registers. In the case where two transits are required, a similar diagram would be used.

The operations necessary for local outgoing communications have already been examined. When an outgoing line is seized, it is advantageous to ensure the communication of the distant station on this line. Consequently said line must be connected to a great number of cords or half-cords, in order that a low probability of loss be ensured, which necessitates that the incoming line come on the elements on which a great number of azimuth positions are reserved for this purpose. Except in the case of exceptions, specialised incoming or transit cords or half-cords will be used, that is to say, that only incoming lines will be connected to the corresponding switches on the side of the calling subscriber. The probability of occupation of the $r$ possible elements, which in this case will all be different, is $$P'_r = \frac{y^r}{n} \cdot \sum_{m=0}^{n=r} e^{-\nu} \frac{y^m}{m!} \quad (1)$$

this probability will therefore be easy to calculate by means of the Poisson function charts. Half-cords will be used for transit communications and cord for the incoming communications called for by incoming and transit registers. As indicated in Fig. 10 (exchange C) said elements may be common for all the incoming directions. These arrangements necessitate that between the transit exchange and the incoming exchange an outgoing junction and a transit junction be provided. But, it is to be noted that nevertheless, there will be a gain in the number of junctions in great networks with high traffic, with respect to known systems, because in said known systems the junctions are supplied with 100 azimuth positions at the most, on condition that the switching stages be multipled. As soon as more than 100 junctions are available, said junctions form several distinct groups. The specialization, moreover, has the advantage that the line equipment is simplified. Finally, the addition of a rotating element (shown in dotted line in Fig. 10) enables the suppression of said specialisation if desired. Among the different cases which arise, it may happen that the transit traffic is too high for $P'_r$ to remain sufficiently low for certain directions, that is:

$$\frac{y}{n} \text{ and } \sum_{m=0}^{n-r} e\nu \cdot \frac{y^m}{m!}$$

near 1, and $r$ not sufficiently high. This indicates that the traffic destined for the direction under consideration is too high. In conventional systems the number of switching stages could be multiplied or direct junctions could be used. The use of direct junctions from A to C for instance, is of particular interest in the present case: said junctions will transit a given traffic indicated by probability curves and the remaining traffic will be transmitted through transit and incoming links AB. Double hunting by increase of the number of azimuth positions or groups of transit cords instead of half cords, may be used, the number of cords being increased, if necessary, without increase in the number of outgoing directions.

In the above description it has been contemplated to use one hundred step-by-step switches such as those used in step-by-step telephone systems. It is obvious that switches having an higher capacity can be used for the connectors or simultaneously for the connectors and the cord circuits; for instance two hundred point step-by-step switches could be used in a 40,000 line telephone exchange. On the other hand it may be of interest to design 1,000 line telephone exchanges by using 10 point step-by-step switches for the cords.

The setting up of local and outgoing calls will now be described. In the particular embodiment represented, the number of cords is limited to 100 for 10,000 subscribers divided into 100 groups. If each hundred group has 10 connectors, the selectors on the calling subscriber side are divided in 10 groups. The selectors on the called subscriber side are divided according to the same way. It will be noted that the operations to be carried out are the following: when a subscriber $r$ places a call, he is connected to a register E (see Figs. 2 to 4) through a free connector of a free cord and through a register finder F. This connection is called originating connection.

The register E then receives the digits of the called subscriber's number. As soon as the two first digits are received, it is possible to determine the chain to be used. The cord C which has been used for the originating connection to the register, gives access on the called party side to a connector of the hundred group to which the called subscriber belongs. If this connector is available, it is the cord C which will be chosen to handle the call; if not, a free chain is hunted for through a finder D which is independent of F. The register controls the setting up of the selectors and of the connectors on the calling subscriber side, under the supervision of the position of the switching devices which have been used for the orginating connection to the register; on the called subscriber's side, the register controls the setting up of the selectors and of the connectors according to the digits received. The register is released as soon as it has tested the availability of the called subscriber. The cords giving access to the same connectors on the calling party side are called "group of cords."

Figure 11 shows how the originating connection of a subscriber to a register is realized. The rectangles in dotted lines represent the following components: AB, a subscriber equipment comprising the line relay 1, the 1,000 ohm cut off relay 2, and line wires A and B; CM1 the starting circuit which is common to one hundred group and comprises a call relay 1, relays 2, 3 and 4 and an 11 point switch R1 with its brushes $r11$, $r12$, $r13$; CR, a connector comprising the test relay 1, the connection relay 2 and the 100 point rotary switch R2 with its brushes $r21$, $r22$, $r23$; CC, part of a cord circuit comprising a test relay 1, a relay 2, a supervision relay 3, a relay 4 for the connection to the register, a busy relay 5, a connection relay 6, and a 100 point switch R3 on the calling party side, with its brushes $r31$, $r32$, $r33$; CM2, a starting circuit of the cord circuits comprising starting relay 1, a busy relay 2 which operates when all the cords of the groups are busy; and E, part of a register comprising a test relay 1, a starting relay 2 and a 100 point switch R4 with its brushes $r41$, $r42$, $r43$ and $r44$.

When a subscriber places a call, its relay 1 operates and controls the operation of relay 1 in CM1.

The switch R1 marks a connector in the hundred group through its brushes $r11$, $r12$, $r13$, and the group of cords giving access on the calling subscriber side to this connector through its brush $r14$. This switch R1 steps forward if one of the relays 2 or 3 is operated. The relay 3, the resistance of which is 50 ohms, does not operate in series with relay 1 of group CM2, the resistance of which is 5,000 ohms, but it operates if relay 2 of this group, which marks the full occupation of the group, is operated. Relay 2 in CM1 operates only if relay 2 in the connector CR is energized. Switch R1 therefore marks, through its brushes, a free connector which is connected on the calling subscriber's side to at least a free cord. In this position relay 1 in CM2, which is connected in series with relay 2 in CM1, operates and through it makes contacts it places a ground potential on a wire connected to all the cords of the group. In the cord CC this wire is connected to switch R3 which is energized when it finds a battery potential through break contacts of relay 1 and of relay 5. If the cord is available, which is characterized by the fact that the relays 1 and 5 are unoperated, the switch R3, and all the corresponding switches of the free connection circuits in the group, step till relay 1 of one of these switches operates and opens the energizing circuit of corresponding switches R3. The test relay 1 operates as soon as R3 reaches a position corresponding to a free connector, which is characterized by the fact that relay 2 is unoperated. In this case, the 100 ohm relay 4 is reached through brush r33 and brush r12 of CM1 and on the other hand a battery potential is found through make contact of relay 1. Relay 1 in CC and relay 4 in CM1 operate simultaneously. Relay 1 in CC stops the rotation and shunts its 300 ohm winding with its 6 ohm winding so that if another cord circuit reaches the azimuth position corresponding to the seized connector, the potential on brush r33 is very close of ground and is insufficient to operate relay 1 in this second cord circuit.

Through a make contact, the relay 4 in CM1 places a ground potential on a terminal of switch R2 of the connector, which energizes through break contact of relay 1 and break contact of relay 2. The stepping is stopped when relay 1 operates due to the fact that it finds a battery potential through break contact of relay 2, rectifier C5, brush r23 and a 100 ohms resistance, if the relay 1 is operated in the subscriber's circuit to which the connector CR is connected, that is, if the subscriber is placing a call. If the subscriber is not placing a call, the potential on brush r23 is a battery potential through 1,000 ohms, which is the resistance of relay 2 in equipment AB. Under these circumstances, relay 1 in CR and relay 2 in CB do not operate.

If R2 is set up on the azimuth position corresponding to a calling subscriber, the hunting is stopped. Through a make contact of relay 1 a battery potential is connected to relay 2, which is, in other respects, connected to ground potential through the 6 ohm winding of relay 1 in CC. Under these circumstances, relay 2 operates and releases relay 1 after having controlled a make contact which replaces the battery potential which was connected by make contact of relay 1. Relay 2 brings terminal r13 to busy ground potential. Relay 2 in AB is connected through R23 to the ground potential through the 6 ohm winding of relay 1 in CC and it operates. The line relay of the subscriber, disconnected, releases and relay 1 of CM1 releases if there is no further call waiting in the hundred. On the other hand, as soon as relay 1 on cord CC operates, relay 2 of this cord operates and causes the starting of all the switches R4 in the available registers, an available register being characterized by the fact that its relays 1 and 2 are not operated. The switch R4 starts hunting. It stops when brushes r41 find a battery potential through 100 ohms characterizing the calling cord circuit (make contact of relay 2, break contact of relay 6). Relay 1 in the register which is similar to relay 1 is the cord circuit and operates in the same way, operates and opens the R4 operating circuit. Relay 2 will operate through a make contact of relay 1, will connect brushes R42 and R43 to supervision relay 3, while relay 4 in the cord circuit which operates through a make contact of relay 1 in the register, connects the subscriber's line to the relay 3 in the register.

Due to the delay of operation of relay 4 in the cord circuit, relay 3 in the register will be connected before relay 4 operates, whereby avoiding any discontinuing of the subscriber's line supply, which during this time is provided through the windings of relay 3 in the cord circuit CC.

The operation of the register is shown in detail in Figures 12a to 12f; these figures give a detailed sketch of the register which comprises two finder switches R4 (Fig. 12c) and R5 (Fig. 12b) which can be connected independently to any cord by means of the brushes. It must be noted that these finder switches are in general in different positions and are thus connected to two different cords. The register further comprises:

Four 11 point switches (X1, X2, Fig. 12e, X3, X4, Fig. 12f) adapted to receive the characters transmitted by the subscribers. The drawing on the particular point is self-explanatory. The pulses are directed by switch X5 (Fig. 12c) successively to switch X1 which receives the first character, then to switch X2 which receives the second character, and so on.

100 point switches Y1 (Fig. 12e) and Y2 (Fig. 12f). Y1 is adapted to mark by means of its bank y13 the azimuth positions from 00 to 99 corresponding to the hundred group of the called subscriber. The first character is marked on bank y11 by the bank x11 of switch X1 and the second character is marked on bank y12 by the bank x21. Y1 operates as soon as the sequence switch R5 (which will be described later on) steps to position 1 through terminal 1 of bank 61. R5 has also reached position 1 when X51 reaches position 3, corresponding to the reception of the first two characters. Relays 5 and 6 operate and stop Y1 when it reaches the wanted position. Y2 is adapted to mark by means of his bank y23 the number of the called subscriber in the hundred group. Its setting is realized in a way similar to the setting of Y1 when all the characters are received (position 5 of X5) under the supervision of banks x31 and x41 of switches X3 and X4, by means of relays 7 and 8. The marking wires from y13 are multipled on the banks y13 of all the registers and each lead is directed to the group of connectors of the corresponding hundred group at a point having the reference a1 on Figure 6. To this point a1 (Fig. 12b) are connected as many wires a1, a3 as connectors in the hundred group. Each wire a1, a3 comprises: a break contact of relay 2 in the connector CR3 (Fig. 12b), a resistor s1, a point a2, connected to control terminals C of the selectors on the called subscriber's side of all the cord circuits giving access to the same connector, those terminals marking the azimuth position of the connector to which the point a2 corresponds. Between a2 and a3 is connected a rectifier C1 which allows the flow of current in one direction only; the point a3 and the link a3—a4 are common to all the cords giving access to the same connectors on the called subscriber's side.

Connections from a4, such as a4, a5, a6, are provided between a4 and all the cord circuit giving access to the same connectors on the called subscriber's side.

Between a4 and a5 is connected a rectifier c'1 and between a5 and a6 is inserted a break contact of relay 6 of the cord circuit. a5 is connected to terminal R46 (Fig. 12a) of finder R4 and it will be used in position 2 of the sequence switch X6 (Fig. 12d) (test of the seized cord), and a6 is connected to the terminal r51 of the finder R5 and it will be used in positions 3 and 4 of the sequence switch X6 (test of any cord).

Each marking wire connected to the banks y23 in the register is multipled on the banks y23 of all the registers and on the terminals R74, of all the connectors in an azimuth position corresponding to its position on the banks y23.

The register further comprises a test device adapted to compare the phase and the magnitude of a pulse received on a control wire. The device comprises a vacuum tube TV1 (Fig. 12c) having two control grids g1 and g2. The pulses corresponding to the register are applied to the control grid g1. The control grid g2 receives the pulses sent out by the register after passing through the different control circuits such as y13, a1, a2, a3 and r51. Tube TV1 operates only if the pulses applied to g1 and g2 are in phase, whereby checking that the received pulse is effectively the pulse sent out by the register. In certain supervision functions, the tube TV1 operates only when the magnitude of the pulse received on g2 is greater than a given value. If these requirements are fulfilled, a negative pulse is obtained at the anode of TV1 and is transmitted to the grid of triode TV2 which is conductive in the absence of pulses. The tube TV2 being blocked, a positive pulse is obtained at the anode of the tube and is applied to the control electrode of a thyratron TH which becomes conducting.

The electro-mecanic relay 9 (Fig. 12f) connected in the anode circuit of the thyratron operates and it releases only when the high tension is cut off.

The register further comprises a sequence switch X6 (Fig. 12d) which is constituted with an 11 point step-by-step switch. It is well known that such switches using shifted brushes give 22 positions.

The selection operations controlled by this sequence switch are started independently of the reception of the digits sent by the calling subscriber, as soon as the second digits have been received. The banks are numbered from x61 to x68. The contact established through bank x61 will be termed x61n. The other banks are used for the following functions: the bank x61 is used to direct the pulses, received from the circuit to be controlled, to the grid g2; the bank x62 is used to modify the bias of grid g2; the bank x63 is used to send the pulses to the brush r45 of the finder R4 for supervision function on the calling subscriber side—x64 is used to connect the pulses to the grid g1 when they have been brought to proper magnitude by means of resistors s3 and s4; the same bank is used to send the pulses to banks y13 and y23 of the switches Y1 and Y2; the bank x65 is used to apply the high tension to the anode of the thyratron and to cut off the high tension circuit when it is necessary; the bank x66 is used for the stepping X6 from one position to the next one, under the supervision of relay 9, or to a position in which the thyratron may be extinguished, the stepping to the next position following immediately; the bank x67 is used to direct the wires controlling the rotation to the break contact of relay 9; the bank x68 is used for different functions.

The operation of the register for the setting up of a call is as follows:

At the beginning, X6 is in position zero. The position 1 controls the translation by Y1 of the two first digits received. When X5 is in position 3 (two first digits received) and when the relay 11 is operated, X6 is stepped to position 1 because X6 energizes through make contact of relay 11, contact x610 of x61 and contact x513. When the setting up of Y1 is completed, relays 5 and 6 operate. Through their make contacts and contact x611, X6 once more operates. It steps to position 2, which is the first position in which a proper chain is hunted for. Three cases are to be considered:

(1) The cord circuit to which R4 is connected gives access to a free connector in the hundred group of the called subscriber. In this case, this fact is ascertained in position 2 and the connection is set up through the cord circuit of the connector which has been used for the originating connection of the calling subscriber to the register. The selector on the called subscriber's side of the cord and the connector on the called subscriber's side have now to be properly set up.

(2) If the cord to which R4 is connected does not give access to a free connector on the called subscriber's side, the sequence switch X6 is stepped to position 3 and the finder R5 tests all the cord circuits of the group to which the seized cord belongs, that is to say all the cords which can reach the connector which has been used for the connection to the calling subscriber. It is only necessary that one of those free cord circuits gives access to a free connector on the called subscriber side. If such a cord circuit is found, it will be used to handle the call. It is then only necessary to set up the selector on the calling subscriber's side to the seized connector which is connected to the calling subscriber and to set up the selector and the connector on the called subscriber's side.

Figure 13:
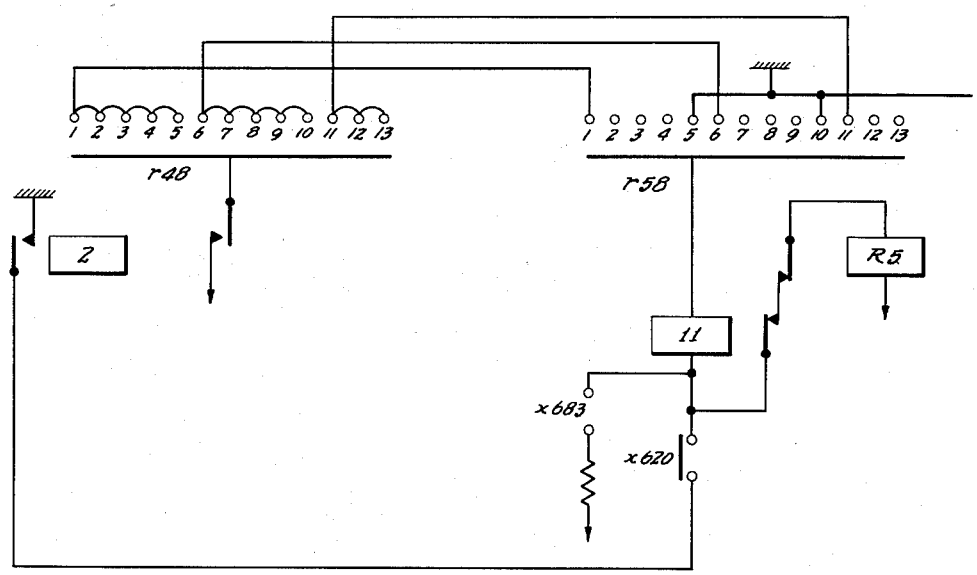
Figures 13 and 14 show detailed circuits of a register.

In order to test in priority all the cords belonging to the groups of the seized cord, the arrangement illustrated in Figure 13 has been provided. In this figure, different terminals of the banks r48 of the finder R4 and of the bank r58 of the finder R5 have been represented.

Terminals 1, 2, 3, 4 and 5 of r48, which correspond to the azimuth positions giving access to the cords of a same group, are multipled together and connected to terminal 1 of bank r58 of the finder R5 corresponding to the azimuth position of the first cord in the same group. The other groups are connected in the same way (terminals 6 to 10) of r48 multipled together and connected to terminal 6 of r58. On the other hand, the last terminals in each group on the bank r58 are grounded. In this way, the finder R5 starts hunting in position zero of the sequence switch X6 as soon as the register is seized through make contact of relay 2. The rotation goes on till the finder is stopped through make contact of relay 11; this happens when R5 reaches the azimuth position corresponding to the first cord circuit in the group to which the cord circuit seized through R4 belongs. It remains in this position till the sequence switch X6 reaches position 3. In the same time, R5 starts hunting and stops if it reaches a proper cord in the group, as will be explained later on. If it does not find any proper cord, it reaches the last azimuth position marked by means of a ground connected to r58. Relay 11 then stops the rotation and, as it will be explained later on, the sequence switch X6 is stepped to position 4.

(3) If the hunting of sequence switch X6 in position 3 fails to locate a cord in the group to which the seized cord belongs, any cord in the exchange is tested in position 4. If such a cord is found, it is necessary to direct the selector of the called subscriber's side to the connector of the hundred group of the calling subscriber, direct this connector (different from the seized one) to the calling subscriber, direct the selector of the cord on the called subscriber's side to the connector of the hundred group of the called subscriber, and then set up this last connector. The sequence switch X6 positions are then the following:

0. Normal;
1. Setting up of Y1;
2. Test of the seized cord;
3. Test of cords of the group to which the seized cord belongs;
4. Test of any cord;
5. Extinguishing of the thyratron;
6. Setting of selector of the cord of the calling subscriber's side;
7. Extinguishing of the thyratron;
8. Setting of connector of the calling subscriber's side;
9. Connection on the calling subscriber's side and extinguishing of the thyratron;
10. Transient position;
11. Setting of the selector on the called subscriber's side;
12. Extinguishing of the thyratron;
13. Setting of the connector on the called party side;
14. Test of the called subscriber; if the called subscriber is free, the connector and the cord circuit are connected; if he is busy, the busy tone is transmitted to the calling subscriber;
15. Transient position;
16. Transient position;
17. The switch steps back to normal;
18. Release of sequence switch X6.

It is seen that in the first case mentioned above, the proper chain is found in position 2. The operations in positions 3 and 4 are not used. The operations in positions 6 and 9 are soon completed. Therefore, the sequence switch must be stepped from position 2 to position 10. In the second case, the proper chain is found in position 3. The operations in position 4 are not used. Those provided in positions 8 and 9 are soon completed. Therefore, the sequence switch must be stepped from position 3 to position 5 and from position 6 to position 10.

Figure 12C:
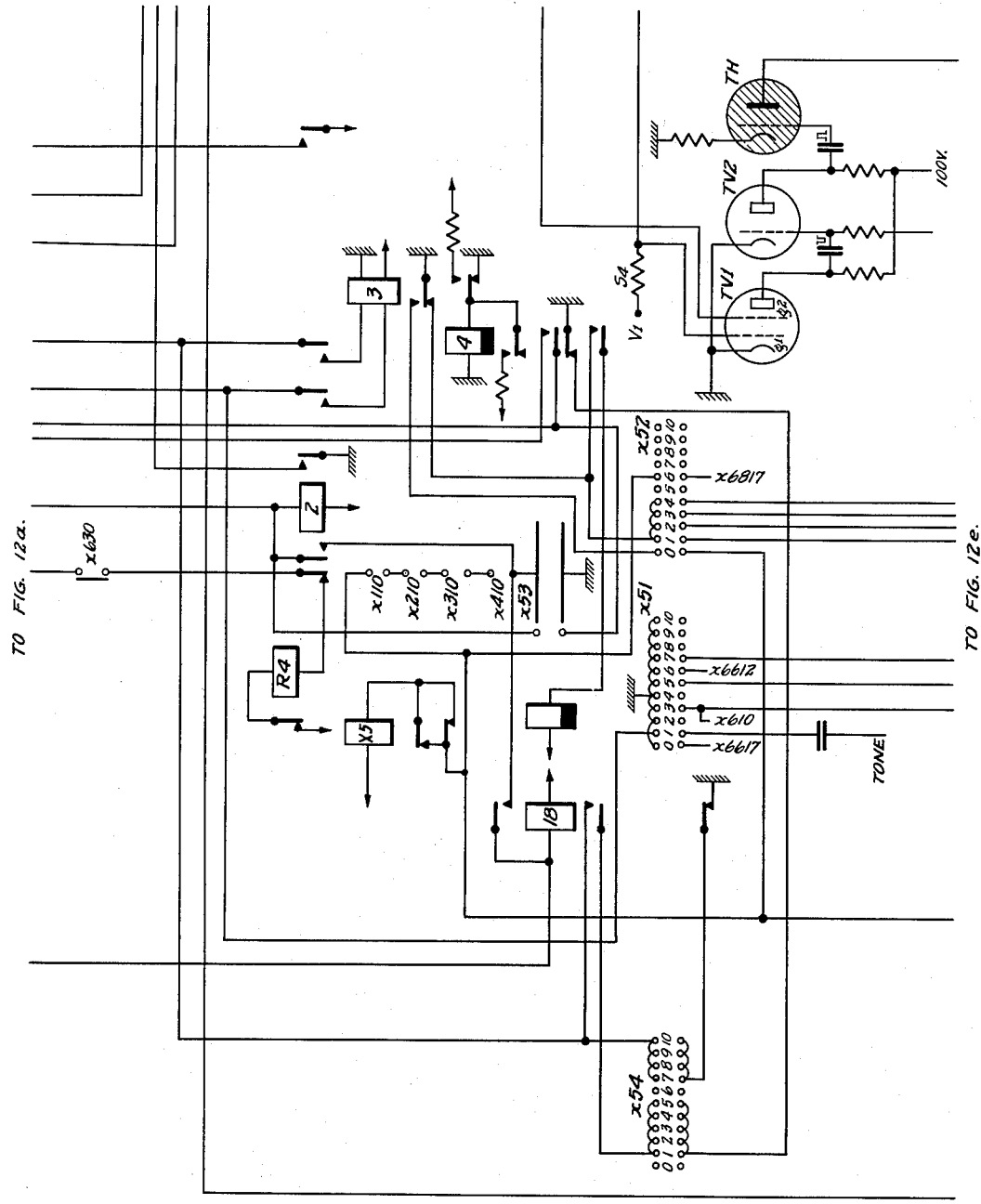
Figure 12D:
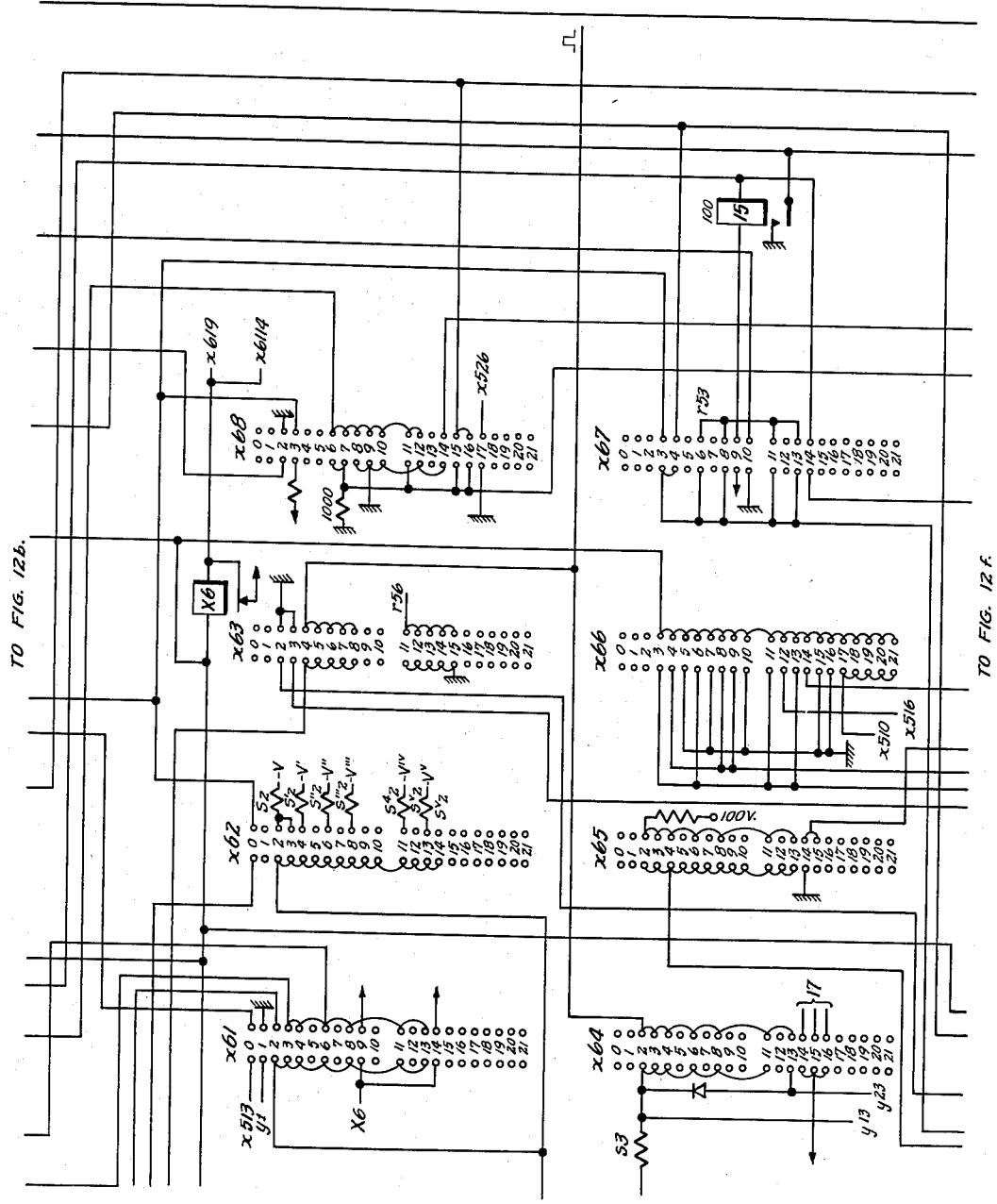

It has been said that the sequence switch has been stepped to position 2 as soon as the switch Y1 is set up. Through $x642$, pulses are applied to $y13$ and $g1$. If the seized cord gives access to a free connector, the continuity of wire $a1$—$a3$ is realized and the pulses appear in $r46$; through $x612$, they are applied to $g2$. The magnitude of the pulses received is conditioned by the value of resistances $s1$ and $s2$. As it has been mentioned, relay 9 operates and energizes relay 10. R5 rotates through break contact of relay 12, make contact of relay 10, make contact $x632$. It is stopped when relay 12 operates through contact $x632$, make contact of relay 10, winding of relay 12, brush $r57$, brush $r47$ and battery potential through make contact of relay 2 in the register (Fig. 12c). As the terminals $r47$ and $r57$ have the same position on the bank and are connected together, relay 12 is operated when R5 reaches the same position as R4. Therefore, R5 seizes the same cord as R4 since it is a proper one. Relay 12 which has stopped R5 remains operated through its own make contact and break contact of relay 13. Relay 12 energizes switch X6 (sequence switch) through a make contact, and the sequence switch is stepped until relay 13 operates, e. g. up to position 10 of the sequence switch. Relay 13 then operates through contact $x6710$.

If relay 9 does not operate in position 2, relay 10 remains also unoperated. In this case, the switch X6 energizes through a break contact of 10 and contact $x632$. The sequence switch is therefore stepped in position 3. Switch R5 is started through break contact of 11, contact $x673$ and break contact of relay 9. It will be stopped when the pulses generated through $x643$ and Y13 are detected in $g2$ through R51 and $x613$. As these pulses pass through a break contact of the cords and of the connectors interconnected, it is ensured that R5 has reached an azimuth position corresponding to a free cord giving access to a free connector of the called subscriber hundred group. As it has been mentioned, the scanning in position 3 is limited to the cords of the same group rather than the group to which the seized cord belongs. The connector to be seized in the calling subscriber's side in order to handle the call is consequently the one which has been seized for the originating connection.

If relay 9 has been operated in position 3 and relay 14 (Fig. 12f) operates through make contact of 10 and contact $x633$ it remains operated through two make contacts and a break contact of relay 13 which will be operated in position 10, as it has been mentioned above, and relay 14 will then be released.

The sequence switch X6 has been energized through contact $x663$ and make contact of relay 9 (Fig. 12f). It is to be noted that in position 4 X6 energizes once more, through $x664$ and make contact of relay 14. It further steps on to positions 8 and 9, due to the fact that X6 energizes through $x668$ or $x669$ and make contact of relay 14.

If relay 9 does not operate in position 3, the sequence switch X6 energizes when the finder R5 has tested all the group of cord circuits, that is to say when relay 11 operates (see Figure 13). Switch X6 then steps to position 4 through make contact of relay 11.

In this position a cord circuit is hunted for, while checking that the connectors on the called and on the calling subscriber's side are free. To understand this control operation, it is necessary to note that R4 and R5 are set up in the different cords. The connection marked between $r47$, $r48$, $r57$ and $r58$ does not exist in any position and $r46$ and $r51$ are not connected to the same point $a3$. The connections to $r46$, $r47$ and $r48$ will not be used in the same way in the operation of the circuit which will be described later on. But the wires connected to the brush $r45$, used for the originating connection in the cord circuit CC1 which is different from the cord tested through R5, have been shown. The switching devices which have been used for the originating connection in the connector CR1 and those which will be used to handle the call in the connector CR2 have also been shown. The terminal $r34$ of the same azimuth position in all the cords is multipled. This is used to mark the hundred group to which the calling subscriber belongs. A wire $b1$, characterizing one hundred group is connected to the point $b$ (Figure 12a). From $b1$ to $b3$, the sketch is the same as the circuits $a1$—$a3$ (the circuit $b1$—$b3$ particular to each connector comprising a make contact of relay 2 in the connector, a resistor $s5$, and a rectifier $c3$). The point $b3$ in the connection $b3$—$b4$ belongs to a group of cords giving access to the same connectors on the calling subscriber's side. The number of connections $b4$—$a5$ connected to $b4$ and comprising a rectifier $c'3$ is equal to the number of cords in the group. The point $a6$ is connected to the terminal $r51$, as has been mentioned.

Figure 14:
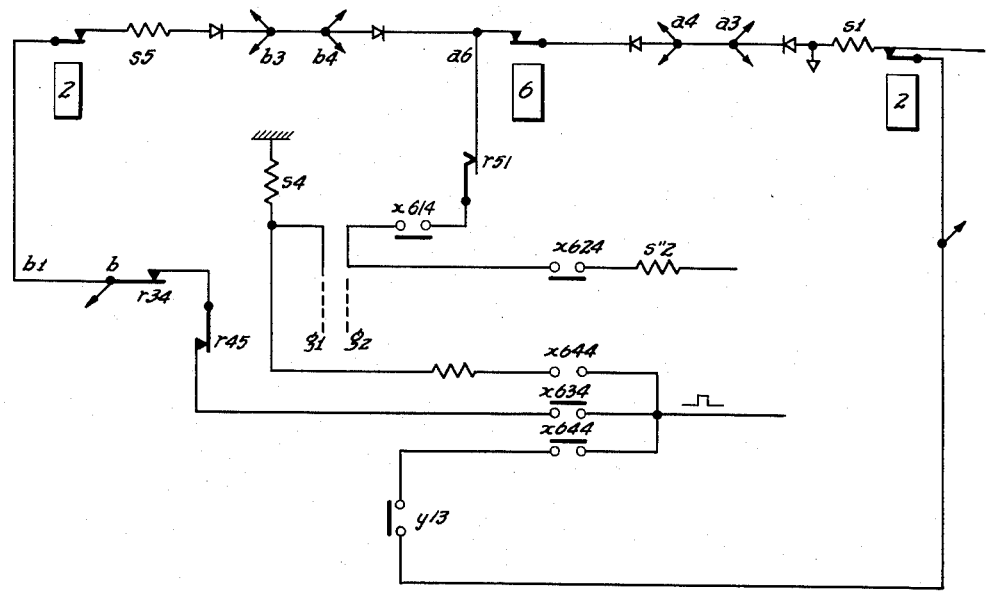

The pulses transmitted through $x634$, $r45$ and $r34$ reach point $a6$ if the cord circuit to which point $a6$ belongs gives access to a free connector in the hundred group to which the calling subscriber belongs. In this same position, pulses are transmitted to $y13$, as in position 3 of the sequence switch. The pulses are also received in $a6$ if the cord is free and if the connector of the wanted hundred group to which it gives access is also free. From Figure 14, it will more clearly be understood how pulses are applied to the grid $g2$. It is supposed that the resistors $s1$ and $s5$ are of the same value, $s''2$ having the same value as S. If the circuits shown on the right-hand side and those shown on the left are established, the magnitude of the pulses applied to $g2$ will be:

$$\frac{W \times S}{S + \frac{1}{2}}$$

if V is the magnitude of the pulses. If one of the two circuits is opened, the amplitude will be reduced to $$\frac{S}{S+s}$$

with $S=S$, in the first case the magnitude is ⅔V and in the second case $$\frac{W}{2}$$

The magnitude is equal to zero if the two circuits are opened.

The tube TV2 must therefore be operated with the magnitude of ⅔V and does not operate with a magnitude of $$\frac{V}{2}$$

If $V=30$ volts for instance, we will have 20 volts in the first case and 15 volts in the second one. With a negative bias on grid $g2$, this difference is readily detected.

In position 4 of the sequence switch X6, the switch R5 is energized through break contact of relay 12, contact $x674$ and break contact of relay 9. It stops when relay 9 operates, that is to say, when a proper cord circuit has been found. The sequence switch X6 then steps to position 5, X6 being energized through contact $x664$, break contact of relay 14 and make contact of relay 9. The thyratron is extinguished so that the sequence switch steps to position 6, X6 being energized through contact $x665$. As it has been stated above, position 6 is a position on which the sequence switch stops only if the wanted cord circuit has been found in position 3 or 4.

In position 6, the relay 5 of the marked cord circuit is energized through brush r54, contact x686 and 1,000 ohm resistance, thus marking the occupation of this circuit. But the relay 7 of the cord circuit, which is connected in shunt, does not operate due to the fact that its resistance is greater than the resistance of relay 5. The relay 7 operates only when a direct ground is connected through contact x688.

The switch R3 energizes through break contact of relays 7 and 8 of the cord circuit, make contact of relay 5 in the cord circuit, brush r53, contact x676, and break contact 9 of the register.

As in position 4 of sequence switch X6, the pulses are sent through contact x636, brush r45, brush r34 of the cord circuit CC1. They appear on terminals r34 of all the cord circuits on the azimuth position, corresponding to the hundred group of the calling subscriber. The marked cord CC2 is started, as has been described; it detects through its brush r34, the presence of pulses when it passes onto an azimuth position corresponding to the hundred group to which the calling subscriber belongs. It transmits these pulses to the grid g2 through break contacts of relays 7 and 8 of the cord circuit, brush x52 and contact x616. The thyratron then operates, as well as relay 9, and the rotation of the switch R3 is stopped. The sequence switch X6 steps to position 7, due to the fact that X6 energizes through contact x666 and make contact of relay 9. It steps immediately to position 8 through contact x667. As has been noted, the position 8 is a position in which the sequence switch stops only if relays 12 and 14 are not operated, that is to say, if the proper cord has only been found in position 4.

In position 8, the relay 7 of the cord operates through r54, contact x688 and direct ground potential. It can be seen that relay 7 connects brush r53 to the brush r31 and the brush r52 to the brush r35. On the other hand, the connector to which cord CC2 is connected is a free one and relays 1 and 2 are unoperated. The switch R2 is then stepped through break contacts of relays 1 and 2 of the connector, second break contact of relay 2, brush r31, make contact of relay 7 in the cord circuit, break contact of relay 8, make contact of relay 5, brush r53, contact x678, break contact of relay 9.

As in positions 4 and 6, pulses are transmitted through contact x638, brush r45 and brush r34 of the cord circuit CC1. Terminals r34 are connected to brush r24 of the connector through a rectifier C4. Terminals r24 in the connectors of the hundred group corresponding to the same subscriber are connected together. The seized connector CR2, when passing onto the azimuth position on which the connector CR1 is stopped, therefore receives the pulses transmitted by the register through brush r24, the pulses being transmitted to the grid g2 through brush r34 of the cord, make contact of relay 7, break contact of relay 8 of the cord circuit, brush r52, contact x618. The thyratron then operates and controls the operation of relay 9, so that the rotation of switch R2 is stopped. The sequence switch X6 steps to position 9, which corresponds to the connection of the calling subscriber and to the extinguishing of the thyratron. For the stepping to position 9, X6 is energized through contact x668, break contact of relay 14, and make contact of relay 9. As it has been noted, this position is a transient one, if the proper cord has been found in position 2 or 3 (relay 12 or 14 operated).

In position 8, the relays 1 and 2 of the connector are always operated. The following circuit is then established: ground potential through the 6 ohm winding of relay 1 in cord CC1, brush r33, make contact of relay 2 of the connector CR1, rectifier C5, brush r23 of connector CR1, brush r23 of connector CR2, relay 3 of connector CR2, break contact of relay 2, brush r32 of cord CC2, break contact of relay 8, brush r55, relay 15 in the register, contact x679 and battery potential. The relay 3 of the connector CR2 then operates, and the relay 2 also operates through the following circuit: ground potential through the 300 ohm winding of relay 3 in the cord circuit CC2, brush r35, relay 2 of the connector CR2, make contact of relay 3 of the connector CR2. The relay 2 then operates and remains operated through its own make contact. The relay 3 of the cord circuit CC2 also operates in series with relay 2 of the connector CR2; it connects its 6 ohm winding through its own make contact which holds the test relay of the calling subscriber.

Due to the rectifier C5 of connector CR1, the ground potential, through the 6 ohm winding in cord CC2, can not hold relay 2 of connector CR1; this allows the release of said relay and also the release of connector CR1 just by connecting the ground potential through 6 ohms of relay 1 in cord CC1. Relay 15 in the register operates at the same time as relay 3 of connector CR2. The energizing of relay 2 of the connector releases these two relays. Relay 15 of the register, through its make contact, energizes X6 which is on the other hand connected to the battery through contact x619 so that its circuit is not broken by its interrupter contact.

The sequence switch steps to position 10 when it is de-energized, that is to say when relay 15 falls back. So it is ensured that the connection is completed. Position 10 is a transient one. X6 once more energizes through x6610, and the sequence switch steps to position 11, which is the position in which the selector on the called party side is set up. In position 10, relay 13 (Fig. 12b) operates, causing the release of relays 12 and 14 which were identifying the fact that the proper cord had been found on positions 2 and 3. The following operations are similar in the three cases. Relay 18 (Fig. 12c) which has been operated through make contact of relay 12 is maintained operated and its function will be explained later on.

In position 11 of the sequence switch X6, relay 8 operates through brushes R56 and contact x6311. It remains operated till position 15 of the sequence switch. It allows the extension in the cord circuit of the control wires of the rotary switch and of the control wires on the called subscriber's side.

On the other hand, relay 7 releases, the contact x6811 providing a feeding through 1,000 ohms, which is sufficient for the relay 5 of the cord circuit, but is insufficient for relay 7. The switch R6 of the selector in the cord circuit on the called subscriber's side, is then fed through break contact of relay 7, make contact of relay 8, make contact of relay 5, brush r53, contact of relay x6711 and break contact of relay 9. The switch R6 rotates till the operation of relay 9. Pulses are transmitted on the one hand to the grid g1 through contact x6411 and on the other hand to the multipled control terminals r64 of the cord circuits through contact x6411, bank y13, point a1, break contact of relay 2 of the selected connector, resistance s1, point a2, and terminal r64. The brush r64 directs the received pulses to the grid g2 through break contact of relay 7, make contact of relay 8, brush r52 and contact x6111. When the switch R6 passes over the marked position, tube TV1 operates and controls the operation of the thyratron and of relay 9 which stops switch. Relay 10 also operates. The sequence switch then steps to position 12 through x6611 and make contact of relay 9, said position corresponding to the extinguishing of the thyratron. Sequence switch X6 steps to position 13 (control of the rotation of the connector on the called subscriber's side) through x6612 and x516. To control the rotation of the connector on the called party side, it is necessary that the two last characters of the called subscriber be received and translated by switch Y2. As soon as these operation are completed, switch x6 steps to position 13. In this position, relay 5 of the cord operates through brush r54, contact x6812 and ground potential. Switch R7 of the connector on the called party side is then energized through break contacts of relays 1 and 2 of the connector, another break contact of relay 2, brush r61, make contact of relays 7, 8 and 5 of the cord, brush r53, contact x6713, and break contact of relay 9. The rotation goes on till the operation of relay 9. Pulses are transmitted on the one hand to grid g1 through contact x6413 and on the other hand through the multipled control terminals r74 of the connectors through contact x6413, bank y23 and terminals r74. Brush r74 directs the received pulses to grid g2 through brush r65, make contacts of relays 7 and 8 of the cord, brush r52 and contact x6113. When the switch R7 passes over the azimuth position of the wanted subscriber, tube TV1, the thyratron and relay 9 operate, stopping the rotation of connector R7. Sequence switch X6 energizes through contact x6613 and make contact of relay 9. It steps to position 14 which corresponds to the test of the called subscriber.

If the subscriber is free, the test relay 16 operates through the following circuit: ground potential, relay 16, contact x6714, brush r55, make contact of relay 8 of the cord circuit, brush r62, break contact of relay 2 of the connector, relay 3 of the connector, brush r73, 1,000 ohm winding of the cut off relay 2, battery. In this case, the cut off relay does not operate, while relay 3 of the connector and relay 16 of the register operate.

Relay 2 of the connector operates also through make contact of relay 3, brush r63, break contact of relay 9, and the same circuit, as for relay 3. The relay 2 causes the release of relay 3 of the connector while it remains operated through its own make contact. Through its own make contact, relay 16 of the register shunts itself by means of its 6 ohm winding. The cut off relay 2 of the subscriber then operates through brush r63 and make contact of relay 2 of the connector, while the sequence switch X6 energizes. A ground potential is provided to the sequence switch X6 through contact x6614 and make contact of relay 16.

On the other hand, a battery is connected through contact x6114. The sequence switch therefore remains energized and it does not step off position 14. It will leave this position upon the release of relay 16. Through another make contact, relay 16 connects a ground potential through 1,000 ohms on brush r59. Relays 9 and 15 of the cords are fed in parallel, but due to the above mentioned resistance, only relay 9, whose resistance is lower than the resistance of relay 15, is operated; it then operates the make contact through which a ground potential is maintained on terminal r63 in order to lock relay 2 of the connector and the cut off relay of the subscriber. It cuts off the feeding of relay 16 of the register and sequence switch X6 steps to position 15, which is a transient position, and the switch moves to position 16. In position 16 of the sequence switch, if the subscriber is free, relay 17 does not operate. It operates only when the subscriber is busy. In the first case, the register connects a ground potential through 1,000 ohm (which is obtained in position 14 through make contact of relay 16) through contact x6815 and terminal r59. Relay 9 of the cord remains therefore operated. In the second case, relay 17 is operated and the sequence switch reaches position 16.

Through its make contact and contact x6815 it places a ground potential without resistance on brush r59. Relays 9 and 15 of the cord CC2 operate in parallel.

Figure 15A:
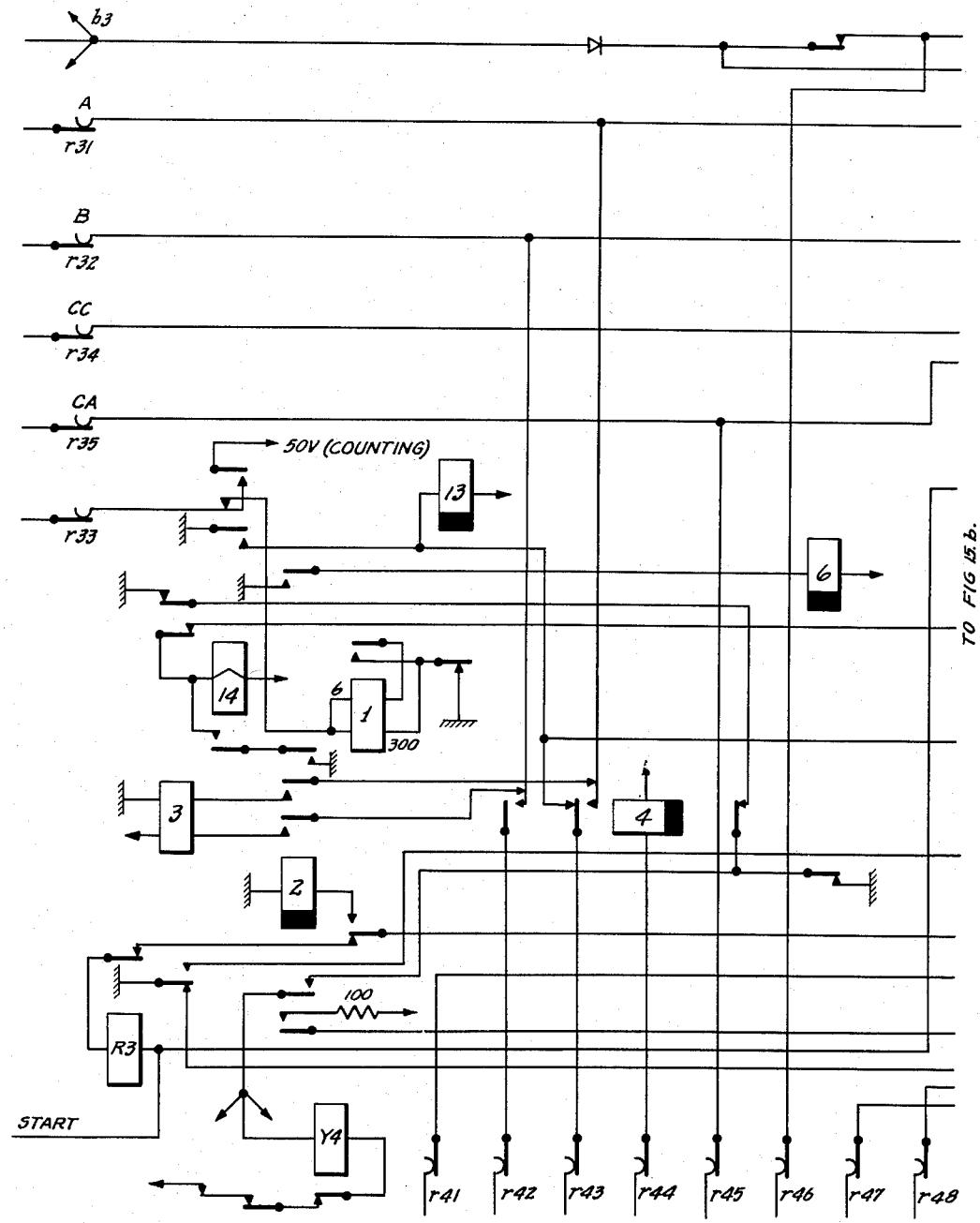
Figures 15a and 15b show a cord circuit.
Figure 15B:
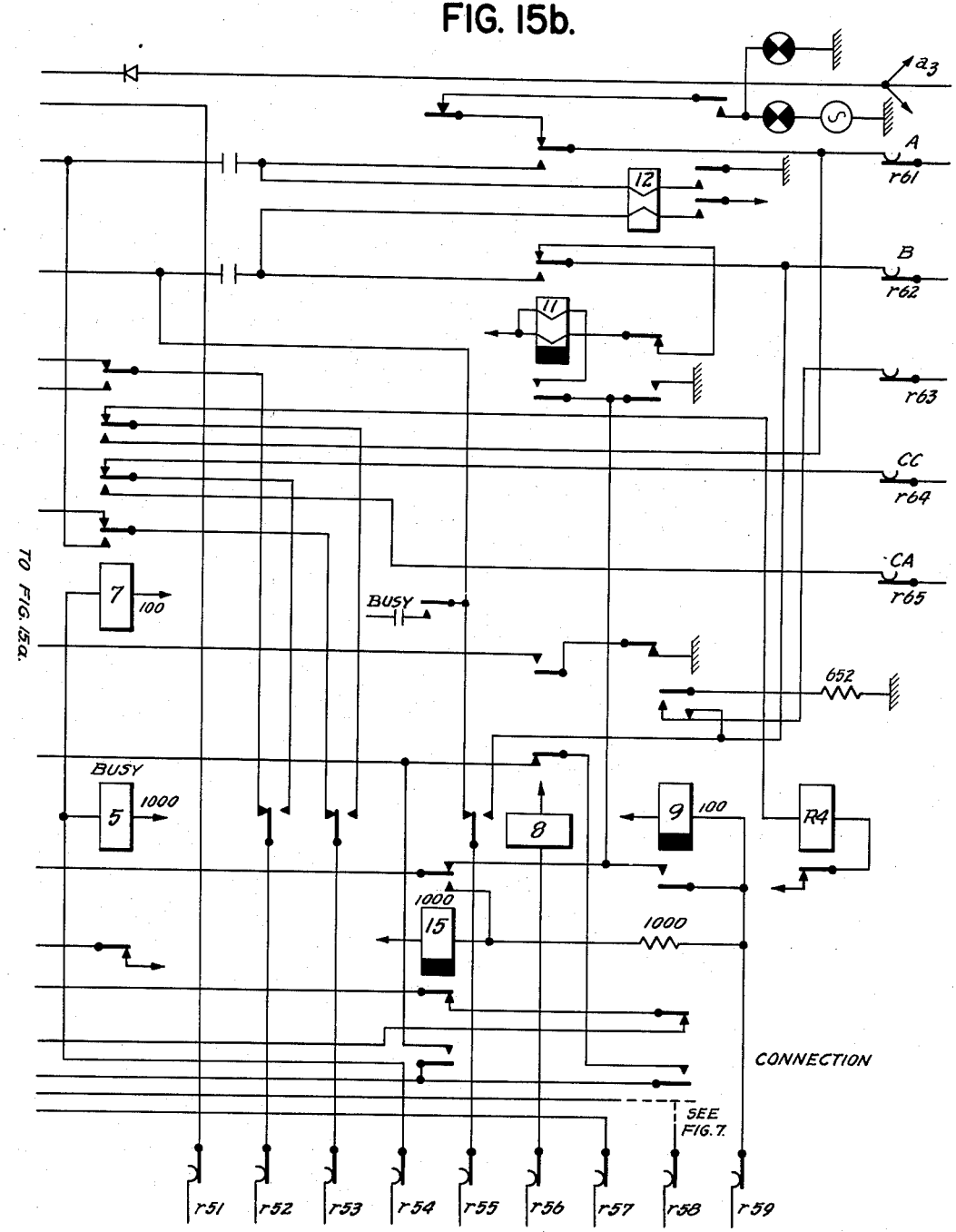
Figure 12E:
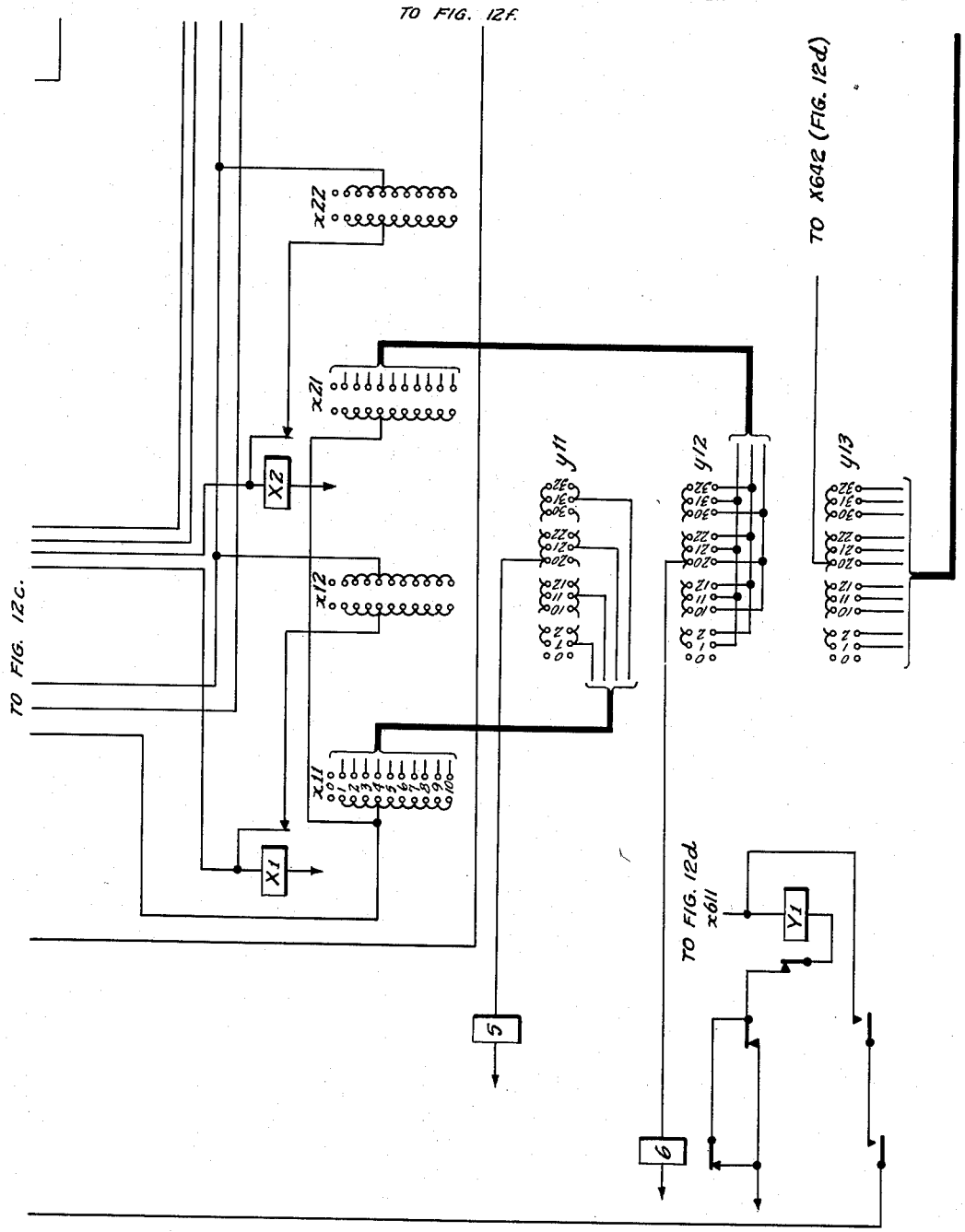

The cord operates then as follows (see Figs. 15a and 15b): if the called subscriber is free, as soon as relay 9 operates, it remains operated through its own make contact, make contact of relay 3, break contact of relay 15. A ringing A. C. is transmitted alternatively with a direct ground on the line wires to the subset of the called subscriber through make contact of relay 9, break contact of relay 15, break contact of relay 11, brush r61, connector line wire and subscriber set, back to brush r62, break contact of relay 11, make contact of relay 9, relay 11, battery. Relay 11 which is not responsive to the ringing current, operates only when the called subscriber lifts up his receiver, due to the flow of direct current. Relay 11 then finds a holding circuit through its own make contact, break contact of relay 15, make contact of relay 3, ground potential.

As soon as relay 11 operates, the called subscriber circuit is fed through relay 12 which operates, and through a make contact, provides a holding potential for relays 9 and 11.

The release and the metering are provided as follows:

The calling subscriber holds the relay 3 as long as he does not hang up his receiver; the called subscriber holds the relay 12 in the same way. As soon as the two subscribers hang up their receivers, the relays 3 and 12 fall back. The last relay, which falls back, cuts off the ground potential which was used to hold the relays 9 and 11. When the relay 9 releases, it cuts off ground potential which was used to hold the relays 2 of the connector and of the subscriber circuit through brush r63; these relays release. The relay 11 being slow to release, does not fall back immediately, thus allowing the operation of the metering relay 14 through a break contact of relay 3, a make contact of relay 11 and a break contact of relay 12. The relay 14 is held through its make contact and make contact of relay 2.

The relay 14, while operating, places a 50 volt positive battery on brush r33; this battery is used, through make contact of relay 2, to operate the metering device of the calling subscriber (relay 3 in line circuit) which is parallel connected with the cut off relay 2. The relay 14 disconnects relay 1 in the cord circuit and the relay 1 releases.

The relay 14 also operates the relay 13 (release). The relay 1, while falling back, opens the energizing circuit of relay 2, which is a slow release relay. When the relay 2 falls back, it opens the circuit of relay 14 which falls back and deenergizes the relay 13. The relay 13 is a slow release relay which allows the falling back of the relay 2 of the connector and of the cut off relay of the line circuit, before the ground potential is reconnected to the 300 ohm winding of relay 1 of the cord circuit, after the falling back of the busy relay 6 which was held by relay 2. When the called subscriber is busy, as soon as the direct ground potential placed through the brush r59 of the register is disconnected (position 17 and following of the sequence switch X6), the relay 9 falls back and the holding circuit is open, due to the fact that relay 15 is energized. When relay 9 falls back, the devices on the called subscriber side are released, as has been explained above. The relay 15 remains energized through make contact of relay 3. A busy signal is transmitted through make contact of relay 15 over the line of the calling subscriber. As soon as this subscriber hangs up, the supervision relay 3 falls back and disconnects relay 15. This relay is slow to release and before falling back it allows the operation of relay 13 through a break contact of relay 3 and a make contact of relay 15. The relay 13 disconnects the ground potential connected to relay 1, which opens the holding circuit of the connector and causes the release of the chain on the calling subscriber side. The relay 1, when releasing, disconnects the relay 2 which then releases the occupation relay 6 in the cord circuit, which thus can be seized by a subscriber or a register.

When the called subscriber does not answer, the release is completed as follows:

During the transmission of the ringing current, the relay 9 in the cord circuit is energized and the relay 11 is unoperated. As soon as the calling subscriber realizes that the called subscriber does not answer, he replaces his receiver and relay 3 in the link circuit restores. The relay 13 operates through a make contact of relay 9, a break contact of relay 11, and a break contact of relay 3. The release of the chain is completed as in the case of a busy called subscriber.

The sequence switch X6 does not stand on positions 14, 15 and 16. The register is no longer used to handle the call, and the sequence switch X6 reaches position 17 through x6615 and x6616.

It is to be noted that except in the case in which the cord circuit initially seized is a proper one, the subscriber is connected to the register through two chains: connector CR1, cord circuit CC1 and finder R4 on one hand, and connector CR2, cord circuit CC2 and finder R5 on the other hand. The first chain is no longer used if all the digits have been received and it might be released. All the digits are received when the sequence switch X5 is on or off position 5. The position 5 corresponds, as it has been noted, to the setting up of the marking switch Y2. When this is completed, X5 steps to position 6, since it energizes through make contact of relays 7 and 8 (Fig. 12f). In position 6 of X5 the sequence switch X6 steps from position 12 to position 13. The sequence switch X6 energizes in position 12 through contact x6612 and x516. It is in position 7 of switch X5 that the finder R4 is released. The sequence switch X5 energizes through x526 and x6817. In position 16 of the sequence switch X6, one of the two relays 8 or 15 of the cord circuit (Figure 15b) is energized, as it has been stated above, and therefore the relay 1 of the register releases and causes the relay 4 of the register and the relay 4 of the cord circuit to restore.

Two cases must be distinguished:

If the cord circuit which has been used for the originating connection has been selected to handle the call, the relay 18 (Fig. 12c) is energized. It was operated when the relay 12 was energized, and it is held through bank contact x53 until the switch X5 steps to position zero. In this case, the cord circuit to which the finder R4 is connected does not have to be released. The circuit which has been used in the register to register the called subscriber number is released, since the switches X1, X2, X3, X4, X5 energize through their banks x12, x22, x32, x42 and through contact X517, so that they reach position zero. When they have all reached position zero, the switch X5 also steps to position zero through contact x110, x210, x310, x410 and bank x53.

It is not necessary to modify the position of switches Y1 and Y2.

If a different cord has been seized, it is necessary to release this cord and the seized connector. In this case the relay 18 is unoperated. Through its break contact and contacts x547 to x5410, a ground potential is applied to wiper r43 in order to operate the release relay 13 through a break contact of relay 4 in the cord circuit (see Figure 15a). The relay 13 disconnects the ground potential which feeds the relay 1 of the cord circuit, which releases and causes the falling back of relay 2 of the seized connector. Since the rectifier C5 is connected between r33 and r23, the relay 2 cannot be energized by a ground potential of another seized connector through the multiplied terminals r23. The connector and the cord circuit are then available for another call. Switches X1, X2, X3, X4, and X5 are in normal position. The sequence switch X6 then steps to position zero through contact x6617 to x6621 and contact x510. The register is then available for another call, its availability being characterized by the connection of the switch R4 to the common starting point in the cord circuit. This continuity is provided through a contact x630 which is closed only when the switches X6 and X5 are in position zero.

It may happen that the switching devices of the chain which has been seized in position 2, 3 or 4 of the sequence switch is seized for another call during the period before the seizure of the corresponding devices. In this case, the register must carry out another test and consequently comes back to position 2. If it is assumed, for instance, that the connector on the called subscriber side has been taken for another call before its connection to the cord circuit, the rotation of the switch R6 goes on, since the pulses are not received in a2, the circuit being open at break contact of relay 2. The abnormal duration of the rotation of the switch, for instance 4 seconds, is found out by means of relay 19 connected to wiper r53 and consequently through contact x6711 to which is connected a ground potential through break contact of relay 9. If a battery potential is applied to point C45, four seconds after the beginning of each hunting, the relay 19 operates if this hunting does not succeed. It holds through its own contacts and energizes the sequence switch X6 through its make contact. The sequence switch steps until the falling back of the relay 19, which appears at the falling back of relay 20, that is to say, in position 2 through contact x682.

In the different figures, it has been shown that the connector on the calling subscriber's side is similar to that on the called subscriber's side. If some difference appears on Figures 12a and 12b, for instance, it is due to the fact that all the connections have not been represented. It appears therefore that a connector can be seized as well for an incoming call as for an outgoing call. The connecting devices form only one group instead of two (finders and connectors in most of the known systems). However, it is to be noted that a difficulty may arise in the establishment of a call between two subscribers belonging to the same hundred group. It may happen that the connector on the calling subscriber side is the same as the connector on the called subscriber's side. In such a case, the communication can be completed, and this case is one of those which have been stated above, that is to say, the case in which the sequence switch of the register steps to position 2. It seems advisable to avoid this possibility and it is easy to provide means, for instance, to avoid the seizure of cords having access on the calling subscriber's side and on the called subscriber's side by connectors having the same rank.

An automatic telephone exchange design according to the present invention and in which lesser number of switching devices are used to handle a call (for 100 point switching devices instead of 5 in known systems) has a very good efficiency because the cord circuits are calculated in perfect groups, as has been explained.

From the above description, it will be noted that the register is no more complicated than in the other systems designed in the last few years.

While I have described above the principles of my invention in connection with specific apparatus, it is to be clearly understood that this description is made only by way of example and not as a limitation to the scope of my invention.

What is claimed is:

1. An automatic telephone system comprising a plurality of lines, a plurality of connecting circuits including cord circuits between a calling line and a called line, registering means for registering the identity of a called line in response to signals transmitted from a calling line, means in said registering means for producing signals, means for transmitting said signals to said called line over a path independent of said connecting circuits, means including a free one of said connecting circuits for transmitting said signals from said called line over the cord circuit of said connecting circuit to said registering means, and means in said registering means responsive to the receipt of said signals for completing the connection through said connecting circuit.

2. An automatic telephone system comprising a plurality of lines, a register, finder switches and selector switches adapted to be interconnected to form connecting circuits between a calling line and a called line under the control of said register, means for connecting said selector switches in pairs to form cord circuits adapted to handle any call from one of said lines to another, means for connecting said register to a calling line over a free cord circuit, means in said register for registering the identity of a called line in response to signals transmitted from said calling line, a finder switch to which the called line is available, means in said register for producing signals, means controlled by said means for registering the identity of said called line for transmitting said signals to said called line over a path independent of said connecting circuits, means in the register for operating said finder switch to hunt for said called line, and means responsive to said signals received over said finder switch and cord circuit for stopping said finder switch on said called line.

3. An autotomatic telephone system, according to claim 1, in which the means in the register for producing signals produces pulses at a predetermined recurrence rate.

4. An automatic telephone system, according to claim 3, in which there are a plurality of registers, and the pulse producing means in each register produces pulses having a different time position with respect to the pulses of every other register.

5. An automatic telephone system in which hunting for a proper connecting circuit is accomplished, comprising a plurality of lines, a plurality of switching devices including a first free finder switch adapted to be connected to a calling line, a second free finder switch adapted to be connected to a called line, and a free cord circuit adapted to be connected on one side to said first finder switch and on the other side to said second finder switch, a connecting lead in each switching device, means for insuring the continuity of said lead when said switching device is free and for causing the discontinuity of said lead when said device is engaged, a register, means for connecting said register to said calling line, means in said register for producing a signalling current, means for applying said signalling current from said register through said connecting means to the leads of the first finder switches having access to the hundred group to which the calling line belongs, a marking switch in said register adapted to be set up according to the digits of the second called subscriber's number, means for applying said same signalling current from said register through said marking switch to said leads of the second finder switches having access to the hundred group to which the called line belongs, means controlled by said register for causing said register to hunt for a proper free cord circuit having access, on one side, to the marked first finder switches, and on the other side, to the marked second finder switches, means in the register for testing the signalling currents received by said register through the free cord circuits from the marked first and second finder switches, and means responsive to said last-mentioned means for completing the connection from said calling line to said called line.

6. An automatic telephone system, according to claim 5, in which there are a plurality of registers and the signalling currents supplied by the registers consist of recurrent pulses of proper duration and magnitude, the time position of which within a basic cycle characterizes the registers.

7. An automatic telephone system, according to claim 5, in which the means for connecting the register to the calling line comprises means for hunting for a free connecting circuit adapted to connect the calling line to the called line comprising a first finder switch and a cord circuit which is different from the switching devices used for the final connection.

8. An automatic telephone system, according to claim 5, in which there are a plurality of registers and the signalling currents supplied by the registers consist of alternating current of distinct frequencies, each frequency or combination of frequencies characterizing a register.

References Cited in the file of this patent

UNITED STATES PATENTS

| | | |
|---|---|---|
| 2,299,897 | Holden | Oct. 27, 1942 |
| 2,590,262 | McAlpine | Mar. 25, 1952 |